United States Patent
Matsuyama

(10) Patent No.: US 9,627,005 B2
(45) Date of Patent: Apr. 18, 2017

(54) VIDEO PROCESSING APPARATUS AND CONTROL METHOD OF VIDEO PROCESSING APPARATUS

(71) Applicant: CANON KABUSHIKI KAISHA, Tokyo (JP)

(72) Inventor: Kazunori Matsuyama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/514,904

(22) Filed: Oct. 15, 2014

(65) Prior Publication Data

US 2015/0110472 A1 Apr. 23, 2015

(30) Foreign Application Priority Data

Oct. 17, 2013 (JP) ................................. 2013-216480

(51) Int. Cl.
- *G11B 27/11* (2006.01)
- *G11B 27/10* (2006.01)
- *H04N 5/783* (2006.01)
- *H04N 21/4402* (2011.01)
- *H04N 21/472* (2011.01)

(52) U.S. Cl.
CPC ............ *G11B 27/102* (2013.01); *G11B 27/11* (2013.01); *H04N 5/783* (2013.01); *H04N 21/440263* (2013.01); *H04N 21/47217* (2013.01)

(58) Field of Classification Search
None
See application file for complete search history.

(56) References Cited

U.S. PATENT DOCUMENTS

| 2004/0036800 A1* | 2/2004 | Ohki ...................... H04N 19/30 348/459 |
| 2009/0103630 A1* | 4/2009 | Fuchikami ............. H04N 5/772 375/240.25 |
| 2009/0174810 A1 | 7/2009 | Endo |
| 2010/0166068 A1 | 7/2010 | Perlman |
| 2014/0099071 A1* | 4/2014 | Adcock .................. H04N 5/783 386/241 |
| 2014/0161198 A1* | 6/2014 | Tan ...................... H04N 19/895 375/240.27 |
| 2015/0110475 A1 | 4/2015 | Kuroki |

FOREIGN PATENT DOCUMENTS

| JP | 2000-308016 A | 11/2000 |
| JP | 2010-171609 A | 8/2010 |

* cited by examiner

*Primary Examiner* — Eileen Adams
(74) *Attorney, Agent, or Firm* — Canon USA, Inc. I.P. Division

(57) ABSTRACT

In a video processing apparatus, an input processing unit inputs a video frame, a first video processing unit performs image processing on the input video frame, and an output processing unit outputs the image processed video frame to display it. Further, a control unit in the video processing apparatus controls the image processing so that a video frame subjected to freeze display in response to an input of a pause instruction to the video processing apparatus is displayed in the high image quality.

21 Claims, 11 Drawing Sheets

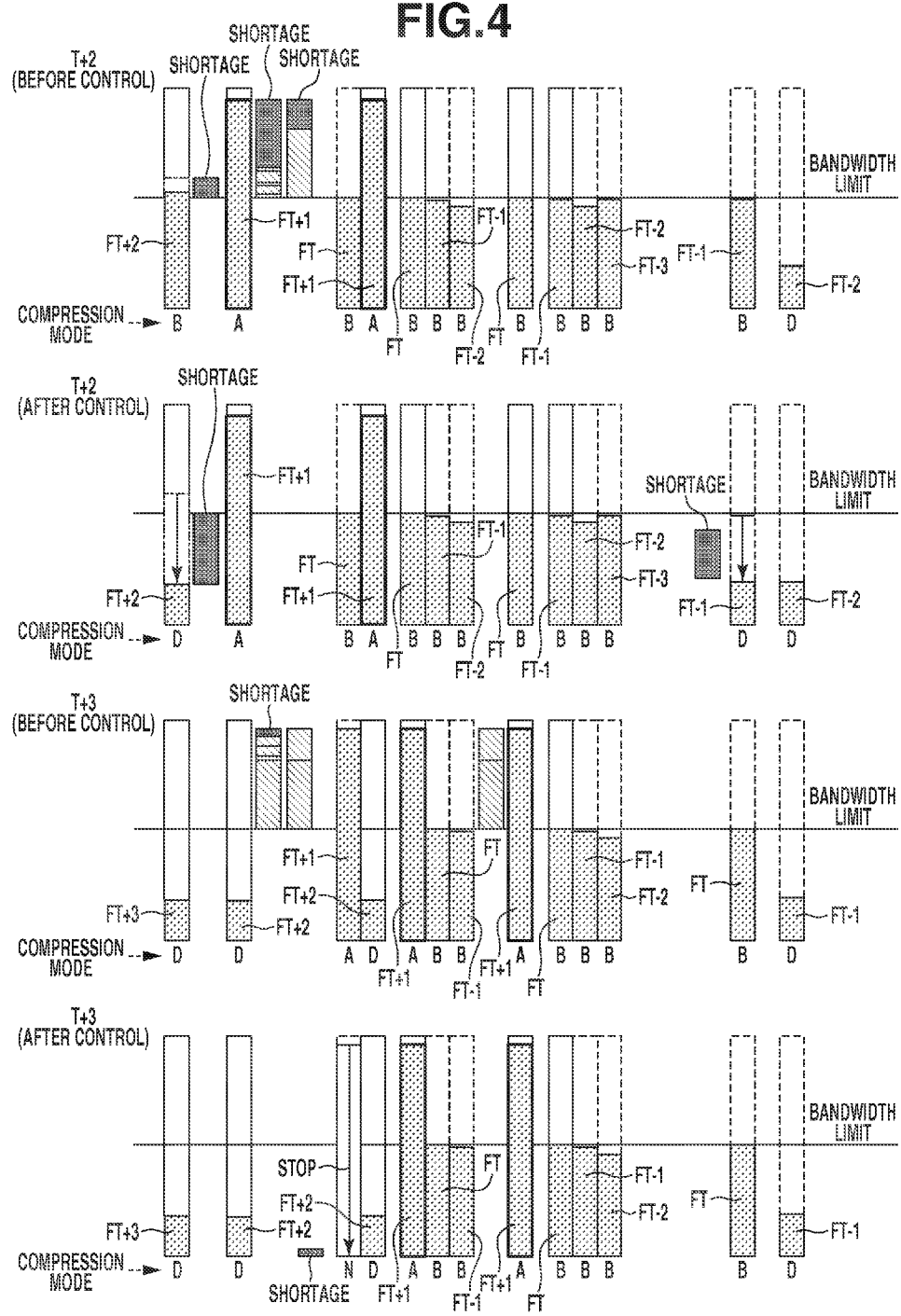

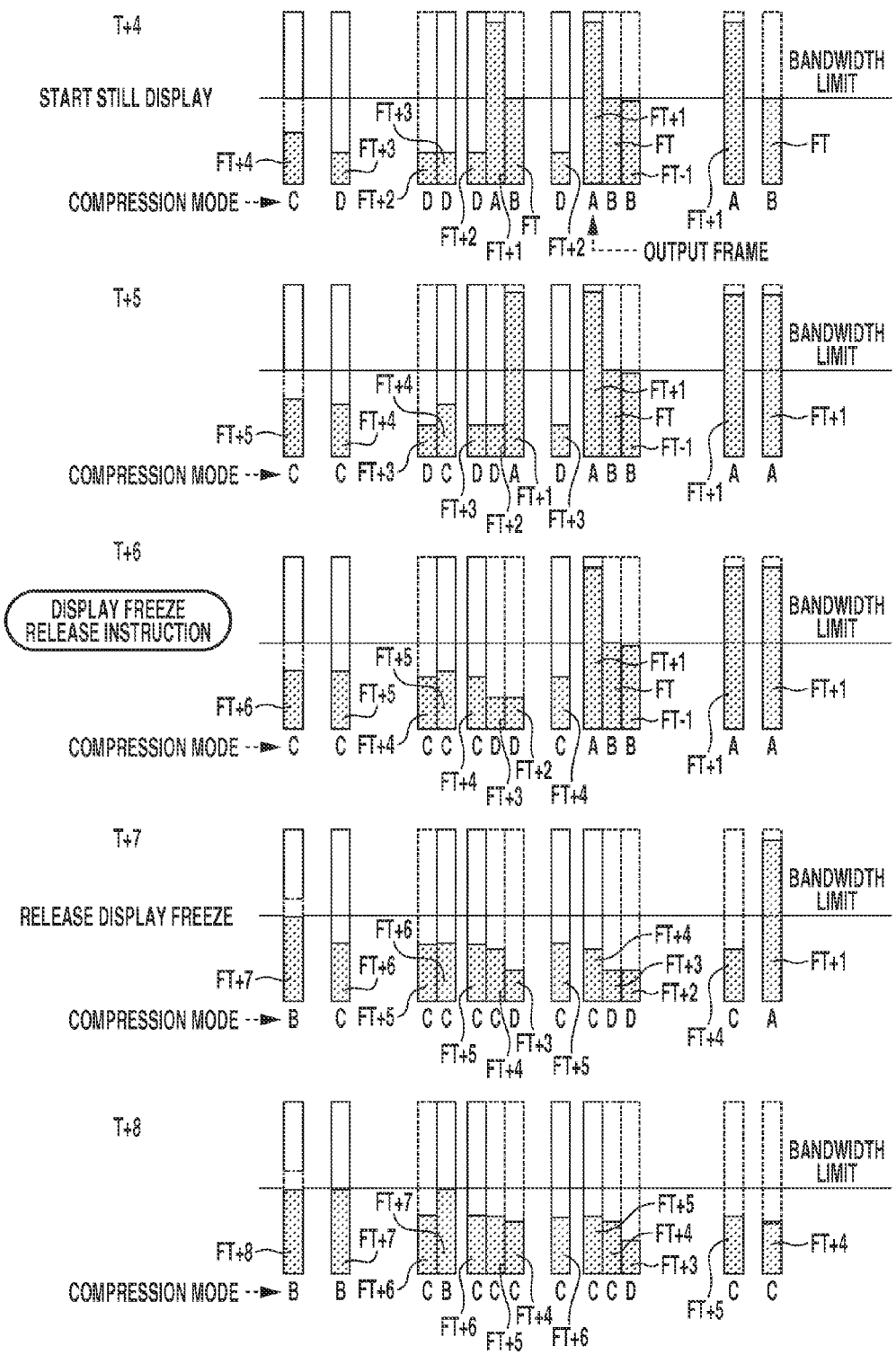

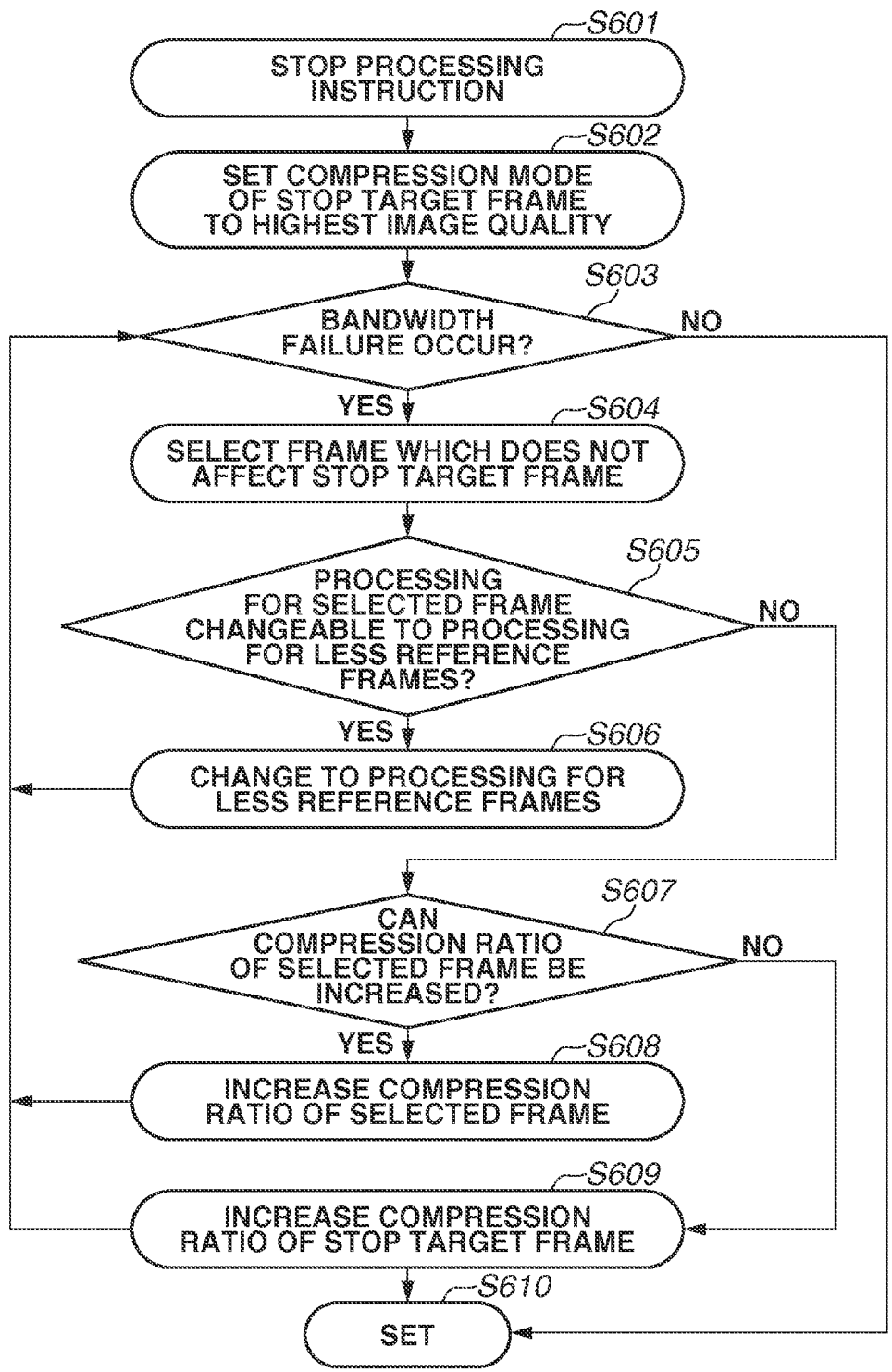

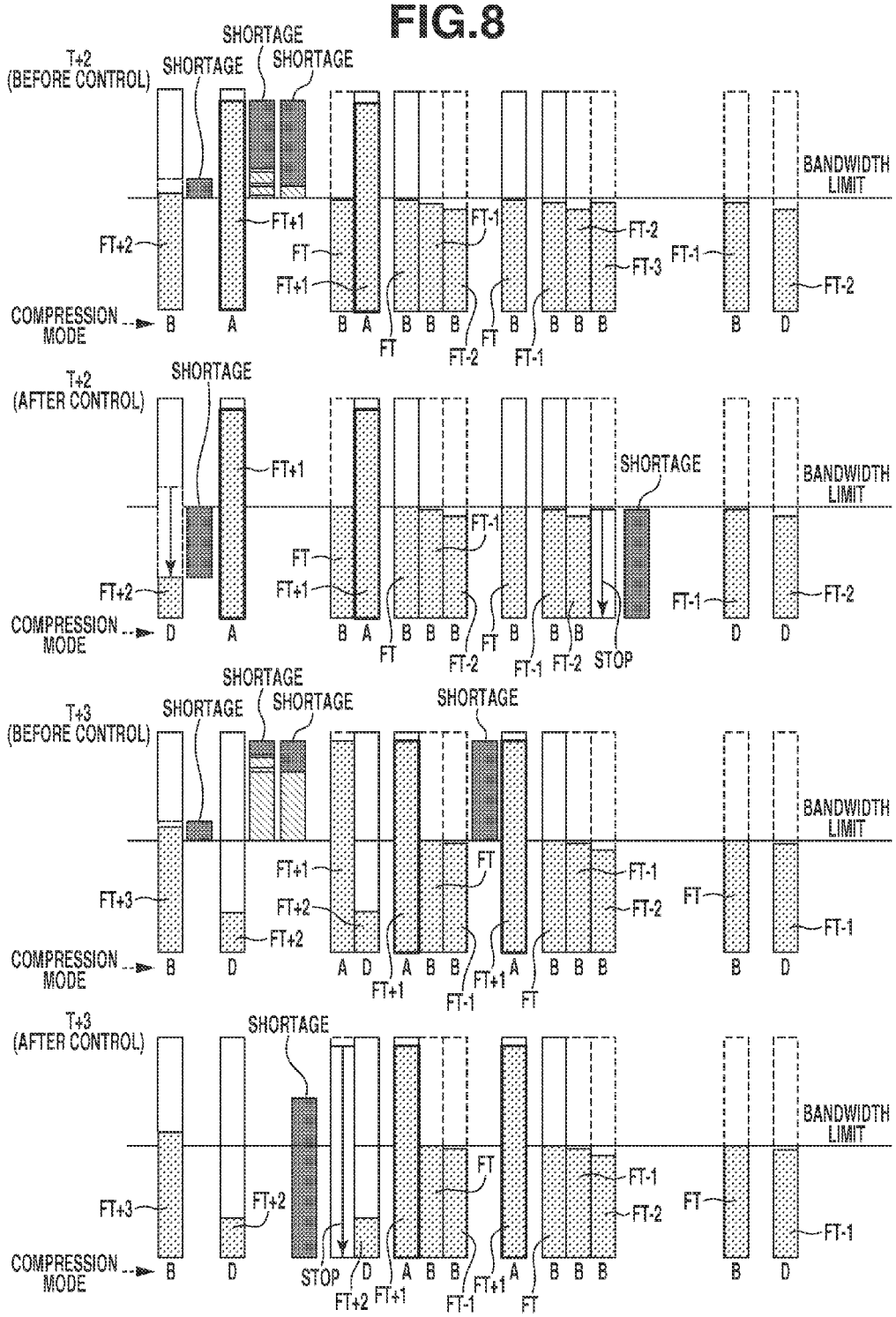

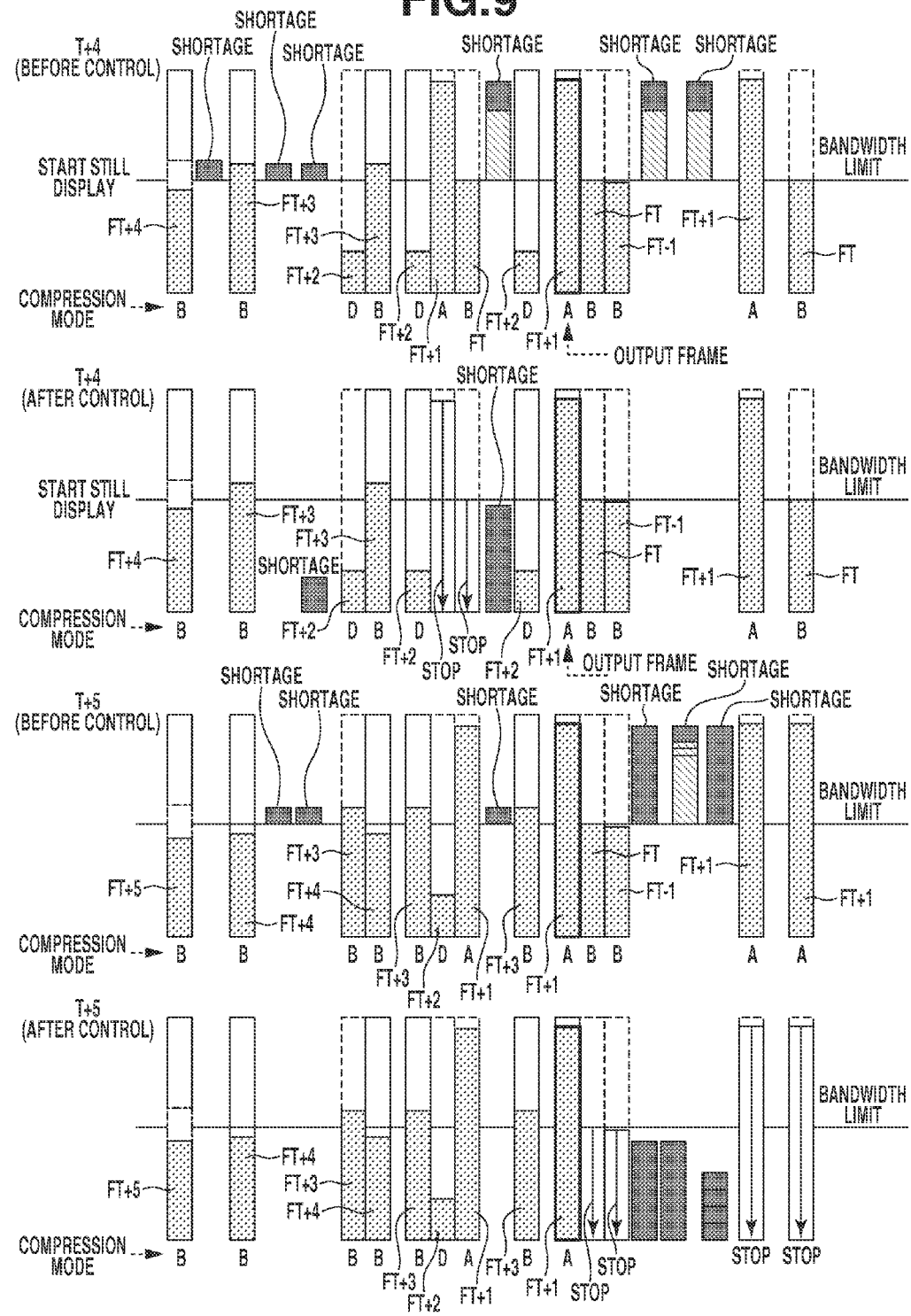

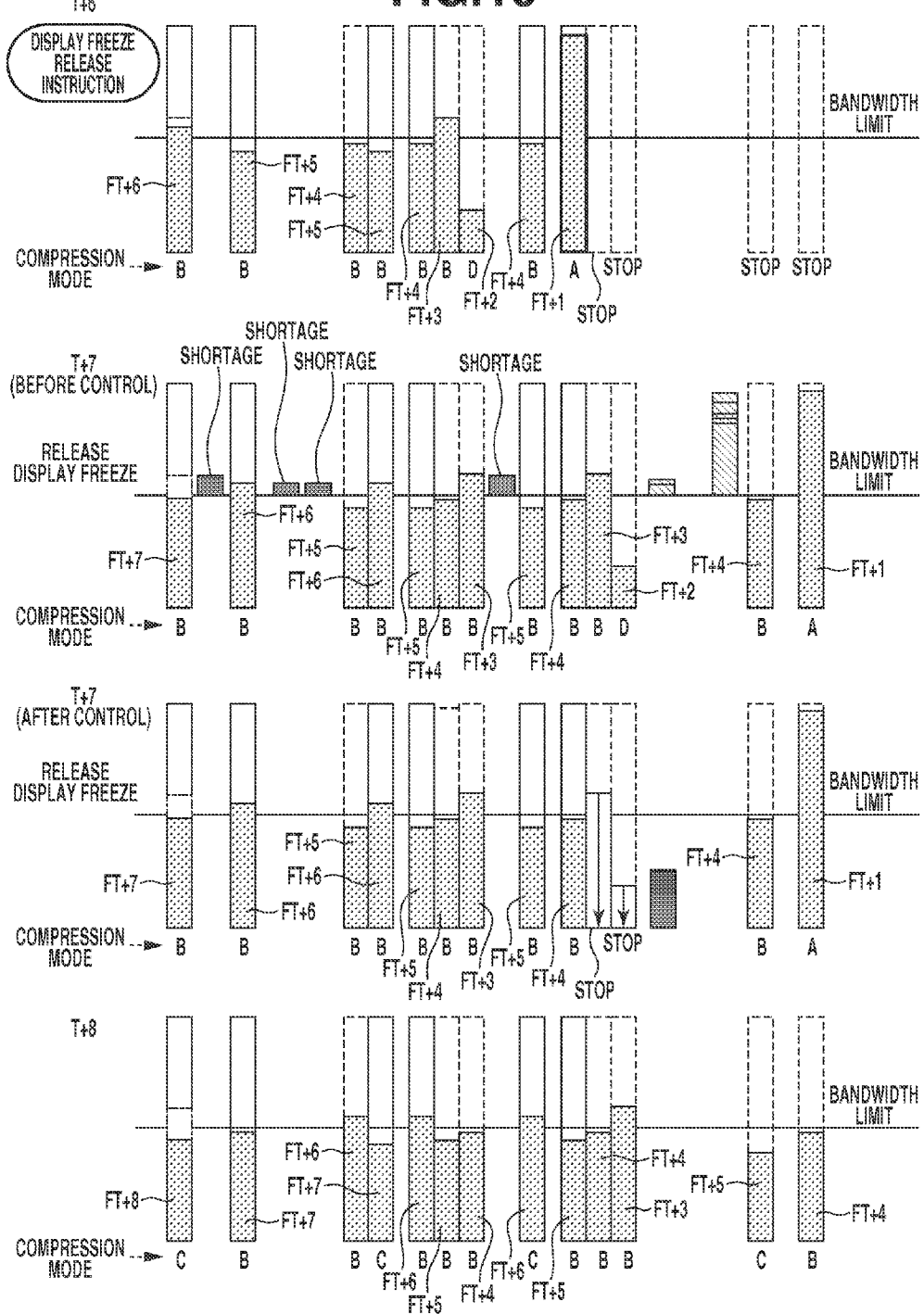

VIDEO PROCESSING APPARATUS AND CONTROL METHOD OF VIDEO PROCESSING APPARATUS

BACKGROUND OF THE INVENTION

Field of the Invention

The present invention relates to a technique for improving image quality of when still display (freeze display) is performed on a display screen.

Description of the Related Art

In a recent video processing apparatus, a data size handled in a system has a tendency to increase according to increase in resolution and precision of image processing. For example, regarding the resolution, there are quad full high definition (QFHD, 3840 pixels*2160 lines) and super high vision (7680 pixels*4320 lines). These resolutions require a data processing amount 4 or 16 times greater than that of a video of an existing high definition (HD, 1920 pixels*1080 lines).

Further, regarding increase in precision of image processing, processing for improving image quality is performed by using a plurality of frames as reference images. For example, according to the interlace-to-progressive conversion (IP conversion) and the double speed processing for generating an intermediate frame, a high precision interpolation image is generated by generating motion vectors with reference to a plurality of intermediate frames stored in a memory. In a super resolution technology, high resolution processing with high sharpness is realized by referring to a plurality of image frames and performing matching processing. In order to realize such advanced image processing, numerous intermediate frames are required to be stored in a memory and read out therefrom, so that a data processing amount will increase.

If such a system which can implement both of the above-described processes for increasing resolution and improving image quality is constructed, there is an issue that required memory capacity and memory bandwidth are increased in a video processing apparatus. Thus, methods using a compression and decompression technique are discussed in order to reduce data amounts which are written into and read out from a frame memory.

Japanese Patent Application Laid-Open No. 2010-171609 discusses a video processing system which compresses input video data to write it into a frame memory and performs video processing by decompressing the video data read out from the frame memory.

Japanese Patent Application Laid-Open No. 2010-171609 also discusses a fact that, when a video is displayed on a still screen or a video is displayed on a high definition television, a setting for increasing a video compression ratio is performed, whereas if the apparatus needs to suppress power consumption to drive a battery, a setting for decreasing the video compression ratio is performed.

Japanese Patent Application Laid-Open No. 2000-308016 discusses a fact that, when a pause instruction (still image mode selection) is issued during display of a Moving Picture Experts Group (MPEG) compressed video, an intra-coded picture is displayed from among the I picture, a predictive coded picture (P picture), and a bidirectionally predictive coded picture (B picture)

However, there is a possibility that quality of a video frame to be displayed during temporary stop in response to a pause instruction to temporarily stop video reproduction becomes low.

For example, if a pause instruction for temporary stop is input when a compression ratio of a video frame in a frame memory is temporarily high because of occurrence of a scene change or the like, there is a risk that a video frame having poor quality in the frame memory is displayed during the temporary stop.

SUMMARY OF THE INVENTION

The present invention is directed to an improvement in quality of a video frame to be displayed in response to a pause instruction for temporary stop.

According to an aspect of the present invention, an image display apparatus configured to display a video based on a video frame includes an input unit configured to input a video frame, a video processing unit configured to perform compression processing on the input video frame, and a control unit configured to control the compression processing so that image quality of a video frame to be displayed during temporary stop in response to an input of a pause instruction to temporarily stop a display video becomes higher than image quality of the video frame in a case where the pause instruction is not input.

Further features of the present invention will become apparent from the following description of exemplary embodiments with reference to the attached drawings.

BRIEF DESCRIPTION OF THE DRAWINGS

FIG. 4 illustrates data sizes passing through the bus 110 from time T+2 to time T+3.

FIGS. 5A and 5B illustrate data sizes passing through the bus 110 from time T+4 to time T+12.

FIG. 6 is a flowchart illustrating operations performed in a video processing apparatus according to an exemplary embodiment.

FIG. 8 illustrates data sizes passing through the bus 110 from time T+2 to time T+3.

FIG. 9 illustrates data sizes passing through the bus 110 from time T+4 to time T+5.

FIG. 10 illustrates data sizes passing through the bus 110 from time T+6 to time T+8.

DESCRIPTION OF THE EMBODIMENTS

Various exemplary embodiments, features, and aspects of the present invention will be described in detail below with reference to the drawings. The exemplary embodiments which will be described below do not restrict to the invention according to the claims. All of combinations of the features described in the exemplary embodiments are not always essential to the means for solution according to the invention.

System Configuration

Figure 1:
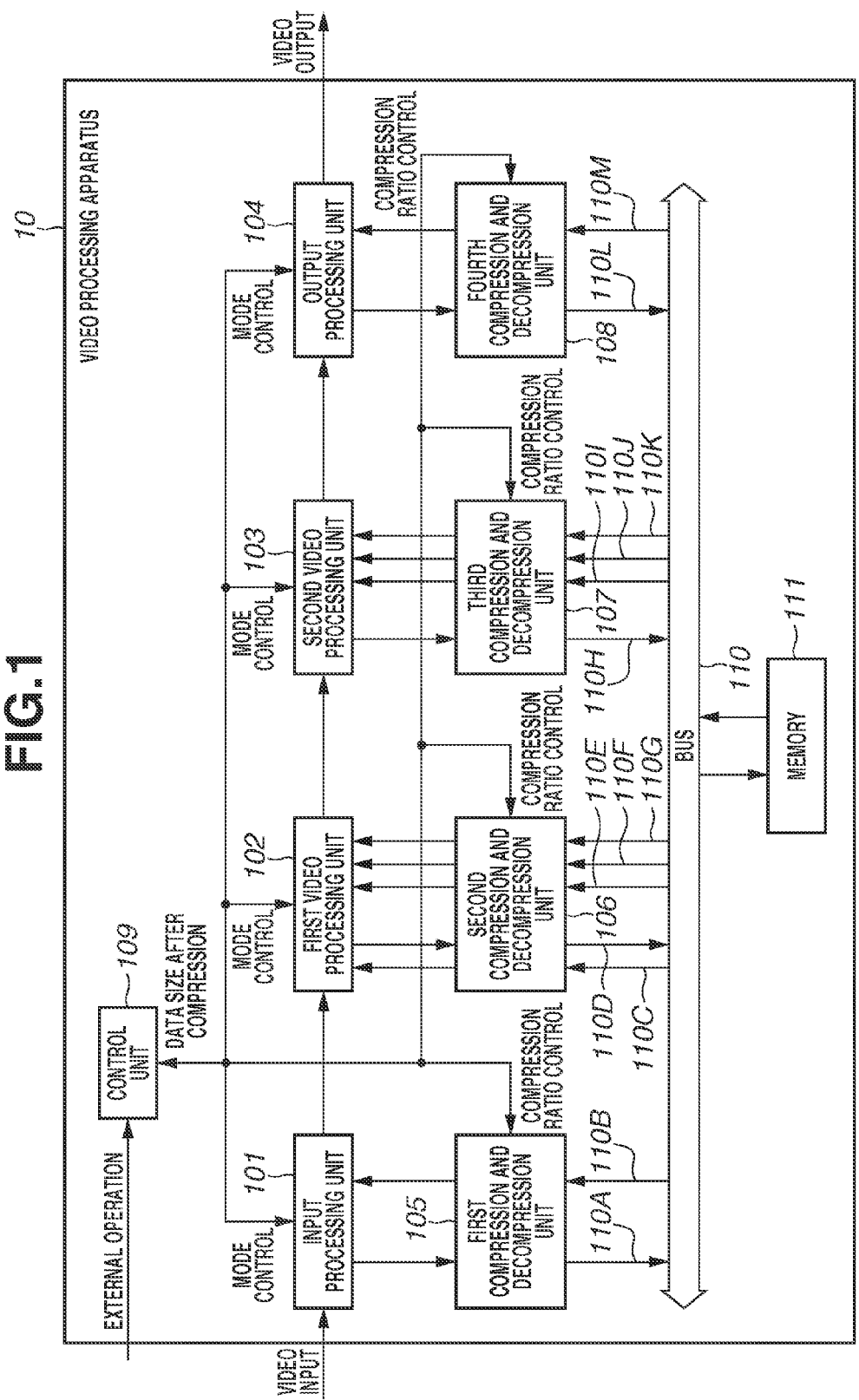
FIG. 1 is a functional block diagram of a video processing apparatus according to an exemplary embodiment.

A configuration of a video processing apparatus according to a first present exemplary embodiment is described below. FIG. 1 is a block diagram illustrating a configuration of a video processing apparatus 10 according to the present exemplary embodiment. As illustrated in FIG. 1, the video processing apparatus 10 includes an input processing unit 101, a first video processing unit 102, a second video processing unit 103, an output processing unit 104, a first compression and decompression unit 105, a second compression and decompression unit 106, a third compression and decompression unit 107, and a fourth compression and decompression unit 108. The video processing apparatus 10 further includes a bus 110 and a memory 111. The video processing apparatus 10 can be implemented as, for example, a large-sized television, a desktop personal computer (PC), a notebook PC, a tablet, and a smart phone. In addition, the video processing apparatus 10 can be implemented as a projection type device, such as a projector.

Video data input from a video input terminal is input to the input processing unit 101. For the video input terminal, video terminals for High-Definition Multimedia Interface (HDMI, registered mark), Display Port, and Digital Visual Interface (DVI) can be used. Further, a video terminal for Serial Digital Interface (SDI) can be also used as the video input terminal. There is no particular limitation for the video input terminal.

The input processing unit 101 can receive video data which is obtained by decoding video data compressed by MPEG. Further, the input processing unit 101 may receive video data from a single interface and from an interface from which a screen is transmitted by being divided into a plurality of signal lines.

The input processing unit 101 converts the video data input from the video input terminal to a video format suitable for the video processing apparatus 10 and outputs the video data to the first compression and decompression unit 105.

The first compression and decompression unit 105 compresses the video data input from the input processing unit 101. The compression unit can compress video data by, for example, Joint Photographic Experts Group (JPEG). However, the compression method is not limited to JPEG, the compression unit can compress video data using a lossy coding method, such as JPEG2000 and JPEG-XR, and a lossless coding method, such as JPEG-Lossless (JPEG-LS) and Run-length encoding. When the video data from the input processing unit 101 is compressed, the first, second, third, and fourth compression and decompression units according to the present exemplary embodiment can compress an entire video frame as a single unit or divide a video frame into a plurality of regions and compress each region individually.

The video data compressed by the first compression and decompression unit 105 is written into the memory 111 via a path 110A of the bus 110. The memory 111 can be provided on the outside of a video processing chip using a double-data-rate synchronous dynamic random access memory (DDR-SDRAM) and the like. In addition, the memory 111 can be provided within the video processing chip using an embedded DRAM (eDRAM) and the like.

The bus 110 according to the present exemplary embodiment can be used by the first compression and decompression unit 105, the second compression and decompression unit 106, the third compression and decompression unit 107, and the fourth compression and decompression unit 108 simultaneously. In other words, each of the compression and decompression units 105 to 108 can access the memory 111 simultaneously via paths 110A to 110M of the bus 110.

When each of the compression and decompression units 105 to 108 according to the present exemplary embodiment divides a video frame into a plurality of regions and compresses each region using a compression method by which a data size after the compression varies, an address into which the video data of each region is written and the data size are stored in the memory 111. According to the present exemplary embodiment, an address in the memory 111 and a data size of the compressed video data of each regions are stored in a table format in the memory 111. Each of the compression and decompression units 105 to 108 updates the table when the compressed video data of the divided region is stored in the memory 111. When each of the compression and decompression units 105 to 108 compresses video data in units of video frame, the memory 111 does not store the table.

The video data compressed by the first compression and decompression unit 105 and written into the memory 111 is input to the first compression and decompression unit 105 via a path 110B of the bus 110. In the case where the first compression and decompression unit 105 divides a video frame into a plurality of regions and encodes it, first, the first compression and decompression unit 105 refers to the table in the memory 111 when being instructed by a control unit 109 to read out the video data. Then, the first compression and decompression unit 105 specifies the address in the memory 111 into which the video data corresponding to the instruction from the control unit 109 is written and the data size thereof, and reads out the video data via the path 110B of the memory 111.

The first compression and decompression unit 105 decompresses the obtained video data of the divided region and outputs the video data to the input processing unit 101. The input processing unit 101 performs predetermined processing (for example, deblocking filter processing for removing a block noise) on the video data from the first compression and decompression unit 105 and then outputs the video data to the first video processing unit 102.

The first video processing unit 102 performs video processing using the video data input from the input processing unit 101. Further, the first video processing unit 102 according to the present exemplary embodiment can perform video processing by reading out video data via a path 110C of the memory 111 as a reference frame. The video data read out via the path 110C is video data which is input prior to processing target video data input from the input processing unit 101.

In other words, the first video processing unit 102 can perform video processing such as improving image quality of a video frame using a video frame of which display order is prior to a video frame input from the input processing unit 101 as a reference frame. In addition, the video processing units 102 to 104 can perform video processing such as improving image quality of a video frame without using a reference frame.

The first video processing unit 102 can adopt a plurality of video processing modes which differ from one another in the number of reference frames and change the number of frames to read out from the memory 111 according to switching of the video processing mode.

For example, when video processing is three-dimensional (3D) noise reduction processing, and the relevant function is ON, the first video processing unit 102 reads out a video frame which is one frame prior to the processing target video frame from the memory 111 as a reference frame and performs the noise reduction processing.

On the other hand, when the 3D noise reduction processing is OFF, the first video processing unit 102 does not read out a reference frame from the memory 111 and does not perform the 3D noise reduction processing.

The video data processed by the first video processing unit 102 is compressed by the second compression and decompression unit 106, and then stored in the memory 111 via a path 110D of the bus 110. Further, the video data is read out via a path 110E, decompressed by the second compression and decompression unit 106, and then input to the first video processing unit 102. The second compression and decompression unit 106 reads out a video frame each via a path 110F and a path 110G as reference frames for the video processing performed on the video frame read out via the path 110E, and decompresses the video frames to input to the first video processing unit 102. In other words, the first video processing unit 102 according to the present exemplary embodiment performs two types of video processing on the video data input to the video processing apparatus 10.

The first video processing unit 102 can perform video processing on the video data input from the second compression and decompression unit 106. Further, the first video processing unit 102 can use the two video frames read out via the respective path 110F and path 110G as the reference frames for performing the video processing on the video frame read out via the path 110E. However, the number of the reference frames may be different depending on the video processing mode of the first video processing unit 102.

For example, when the first video processing unit 102 performs resolution conversion processing as the video processing and a multi-frame super resolution processing mode (a first video processing mode) is set, the first video processing unit 102 reads out one reference frame each via the paths 110F and 110G of the memory 111 and performs the super-resolution processing.

On the other hand, when an single-frame super resolution mode (a second video processing mode) is set, the first video processing unit 102 performs the super-resolution processing on a processing target video frame without reading out a reference frame from the memory 111. In other words, the first video processing unit 102 can switch between the first video processing mode and the second video processing mode of which reference frames are less than that of the first video processing mode. In this regard, quality of a video after video processing is generally higher when the video processing is performed in the first video processing mode than when the video processing is performed in the second video processing mode.

The first video processing unit 102 inputs the video data after the video processing to the second video processing unit 103. The second video processing unit 103 performs video processing on the video data input from the first video processing unit 102. The video data after the video processing by the second video processing unit 103 is compressed in the third compression and decompression unit 107 and output to the memory 111 via the path 110H of the bus 110.

The third compression and decompression unit 107 reads out the video data as a processing target frame via a path 110I of the bus 110 and decompresses it. Further, the third compression and decompression unit 107 can read out video data of one video frame each via a path 110J and a path 110K of the bus 110 as video data of a reference frame and decompress them.

The second video processing unit 103 performs the video processing on the video data of the video frame from the path 110I using the video data of the reference frame from the path 110J and the path 110K. The second video processing unit 103 according to the present exemplary embodiment performs frame rate conversion processing as the video processing. The frame rate conversion processing is video processing for converting a frame rate of video data input to the input processing unit 101 to a frame rate of video data output from the output processing unit 104. For example, the second video processing unit 103 can obtain an output of 60 video frames per second with respect to an input of 30 video frames per second by the frame rate conversion processing.

The second video processing unit 103 can also use a technique for inserting a black frame as simple frame rate conversion processing. In other words, the second video processing unit 103 can perform the frame rate conversion processing by displaying a black video frame between a first video frame and a second video frame which are continuous in an input display order. When insertion of a black frame is used as the frame rate conversion processing, a reference frame needs not be read out. Thus, using the method for inserting a black frame as the frame rate conversion processing can reduce a data size of video data passing through the bus 110 more than a method for generating an intermediate video frame (interpolation video frame). In other words, using the method for inserting a black frame can widely clear a bandwidth of the memory 111 than the method for generating an intermediate video frame. The second video processing unit 103 inputs the video data after the video processing (after the frame rate conversion processing) to the output processing unit 104.

The output processing unit 104 converts a video data format based on the video data from the second video processing unit 103 from a video format in the video processing apparatus 10 to an output format of a video output unit. Then, the output processing unit 104 outputs the video data after the format conversion processing to display it. An output destination of the video data can be a display unit, such as a liquid crystal panel, a plasma display, and an organic electroluminescence display (OELD). When the video processing apparatus 10 is realized by a projector, video data is output to an arbitrary projection surface.

When video data is output from the output processing unit 104 to a liquid crystal panel, overdrive processing is performed to improve a response speed. The overdrive processing utilizes a difference between an output target video frame and a video frame output prior to the output target video frame. Thus, the output processing unit 104 obtains video data of the video frame output prior to the output target video frame from the fourth compression and decompression unit 108. More specifically, the fourth compression and decompression unit 108 compresses the video data of the video frame which has been already output and stores it in the memory 111 using a path 110L. Further, the fourth compression and decompression unit 108 reads out the stored video data using the path 110M to decompress and output it to the output processing unit 104.

Accordingly, the output processing unit 104 determines a voltage applied to a display circuit of the liquid crystal using the video data of the video frame previously output and the video data of the video frame to be output.

Further, the output processing unit 104 stores the video data of the output video frame in the memory 111 via the path 110L of the bus 110. The stored video data is used in the overdrive processing for a video frame to be output later.

When a pause instruction (pause instruction) for freezing (temporarily stopping) a display video is issued during display of a moving image, the control unit 109 according to the present exemplary embodiment controls the output processing unit 104 to continue outputting video frame after the video processing by the second video processing unit 103. Each of the processing units 101 to 104 and the compression and decompression units 105 to 108 according to the present exemplary embodiment operates in accordance with the control by the control unit 109.

Operations of the Video Processing Apparatus 10 During Display of a Moving Image The control unit 109 controls compression ratios of the compression and decompression units 105 to 108 and bandwidth allocation of the bus 110 so as to improve image quality as much as possible within a range that the memory 111 will not cause bandwidth failure based on resolution, a frame rate, and a video processing mode of each video frame in a normal video display state. The video processing mode can be set or switched according to a user instruction.

Generally, a data size of a video frame after compression varies according to a value in a quantization table at the time of compression. According to the present exemplary embodiment, a case when resolution of a video input to the video processing apparatus 10 and resolution of a video output from the video processing apparatus 10 are the same is mainly described as an example. In other words, a case when resolution conversion processing that the first video processing unit 102 can perform is OFF is mainly described as an example.

The control unit 109 can realize control of the compression ratio by switching a compression mode of each of the compression and decompression units 105 to 108. According to the present exemplary embodiment, a case when the compression mode is controlled in four steps, namely modes A to D is described, however, the mode is not limited to four steps.

According to the present exemplary embodiment, features of each of the compression modes are defined as follows.

The compression mode A is a compression mode in which compression is performed with the highest quality (image quality) among the compression modes A to D. However, the compression ratio is the worst among the compression modes A to D, and the compression ratio is 80% on average and 90% at the worst. In other words, when the compression mode A is used, a data size of the video data after the compression is 80% of that before the compression on average and 90% of that before the compression at the worst.

The compression mode B is a compression mode in which compression is performed with the second highest quality (image quality) among the compression modes A to D. The compression ratio is 45% on average and 60% at the worst.

The compression mode C is a compression mode in which compression is performed with the second lowest quality (image quality) among the compression modes A to D. The compression ratio is 35% on average and 50% at the worst.

The compression mode D is a compression mode in which compression is performed with the lowest quality (image quality) among the compression modes A to D. However, the compression ratio is the best among the compression modes A to D, and the compression ratio is 10% on average and 20% at the worst.

According to the present exemplary embodiment, it is required that a data size of each input video frame after compression becomes 50% of a non-compressed data size or less one on average so as not to cause bandwidth failure of the memory 111 even if all of the paths 110A to 110M are used.

In order to prevent the failure in the memory bandwidth in the video processing apparatus 10, it is only necessary for each of the compression and decompression units 105 to 108 to perform compression and decompression processing using the compression mode C of which worst compression ratio is 50%. The worst compression ratio of the compression mode C is 50%, however, if an average video frame is compressed in the compression mode C, the video frame is compressed to 35% of a data size before the compression.

On the other hand, when each of the compression and decompression units 105 to 108 compresses an average video frame using the compression mode B of which image quality after the compression and decompression is better than that of the compression mode C, the video frame is compressed to 45% of the data size before the compression. Therefore, if all input video frames are average video frames, even if each of the compression and decompression units 105 to 108 performs compression using the compression mode B, a video having higher quality than that of when using the compression mode C can be output without causing the bandwidth failure.

However, when the compression mode B is used, a data size of a video frame after the compression is 60% of that before the compression depending on features of a video input to the video processing apparatus 10. In other words, if video frames of which compression ratio is 60% are continuously input, there is a possibility of causing the bandwidth failure. Therefore, the control unit 109 according to the present exemplary embodiment dynamically controls the compression mode as described below to improve image quality of an output video while preventing failure of the memory bandwidth.

When compression and decompression is performed for a plurality of times as in the case of the video processing apparatus 10 according to the present exemplary embodiment, and when a video frame which has been compressed once is compressed again using the same compression method, the video frame can be compressed to a data size approximately same level as that of the first time if resolution conversion or the like is not accompanied. More specifically, in the case that the first compression and decompression unit 105 compresses a video frame in the compression mode C and data size after the compression is 40% of that before the compression, if the video frame is decompressed and then compressed by the second compression and decompression unit 106 in the compression mode C, the compression ratio is approximately 40%.

By making use of the above-described features, the control unit 109 according to the present exemplary embodiment estimates a data size after compression of the second time or later using a compression result in the first time and calculates a limit value of the memory bandwidth and a margin. The limit value of the memory bandwidth according to the present exemplary embodiment is 50%. In other words, the control unit 109 limits the compression mode (the compression ratio) of each of the compression and decompression units 105 to 108 so that a total sum of data sizes of video frames to be read out from and written into the memory 111 will be 50% of a non-compressed data size.

For example, if an estimated increase amount of the data size when the compression mode for image quality improvement is changed from the mode C to the mode B is smaller than the margin, the control unit 109 changes the compression mode for compressing a video frame newly input to the video processing apparatus 10 to lower the compression ratio. The control unit 109 can estimate an increase amount of the data size caused by a change in the compression mode using the worst compression ratio of each compression mode.

On the other hand, in the case that the data size is increased due to a change in features of an input video or the like after changing the compression mode from the mode C to the mode B to lower the compression ratio, and possibility of occurrence of the bandwidth failure is raised, the control unit 109 returns the compression mode of each of the compression and decompression units 105 to 108 from the mode B to the mode C. Accordingly, the data size after compression is reduced, and failure of the memory bandwidth can be avoided.

In this regard, a data size to be written into the memory 111 can be reduced by changing the compression mode, however, a data size to be read out from the memory 111 cannot be reduced by changing the compression mode. However, like JPEG2000 and so on, if the coding method having a characteristic that can hierarchically perform decoding is used, a data size to be read out can be changed. In other words, the control unit 109 can reduce a data amount passing through the bus 110 by controlling a reading amount of the compressed video data in addition to the change in the compression mode.

A data size after compression by the first compression and decompression unit 105 which first compresses the video data input to the video processing apparatus 10 varies according to features of the video data, so that it is difficult to estimate the data size in advance. Therefore, the control unit 109 according to the present exemplary embodiment estimates a data size based on the worst compression ratio of the compression mode set to the first compression and decompression unit 105 as a data size passing through the path 110A so as not to cause failure of the memory bandwidth in the system. The path 110A is a path for writing the video data from the first compression and decompression unit 105 into the memory 111. According to the above-described operation, even if features of a video are changed because of a scene change and a data size after compression is steeply changed, processing can be performed without causing failure of the memory bandwidth.

When a video frame is divided into a plurality of regions and coded by the different compression modes, a bandwidth for a data size in the case of the worst compression ratio is not secured, and the compression mode can be changed in the middle of the video frame according to a data size after compression of each divided region. More specifically, if failure of the memory bandwidth is estimated by referring to a data size after compression of a first divided region of the video frame, the control unit 109 can change the compression mode for compressing a second divided region.

As described above, the control unit 109 performs the bandwidth control to realize compression processing in the compression mode which is suitable in the aspect of the image quality while avoiding the bandwidth failure. The control unit 109 includes a general purpose processor or hardware for performing a determination described below, and controls each processing unit (the input processing unit 101, the first video processing unit 102, the second video processing unit 103, the output processing unit 104, and each of the compression and decompression units 105 to 108) according to a processing flow which is described below. The control unit 109 is connected to each processing unit as illustrated in FIG. 1 to control the video processing mode and the compression and decompression mode in the video processing apparatus 10. Further, the control unit 109 obtains a data size after the compression by each of the compression and decompression units 105 to 108 to control the compression and decompression mode. Then, based on the obtained data size, the control unit 109 determines the video processing mode and the compression mode used for processing a next video frame according to the processing flow described below and controls each processing unit.

Furthermore, the control unit 109 controls each processing unit in response to an instruction based on a user operation or the like. According to the present exemplary embodiment, a case when an external operation is a pause instruction is described as an example. The pause instruction is an instruction to temporarily stop a display video. When the pause instruction is issued, one of video frames composing a moving image is continuously displayed until a pause release instruction is input. The pause instruction includes instructions to temporarily stop a moving image being displayed, to capture the moving image being displayed, and the like. According to the present exemplary embodiment, a case when a pause instruction is input by a user operation is mainly described as an example. However, the idea of the present invention can be applied to a use case in which a pause instruction is automatically input in a specific situation, for example. When a pause instruction is input by a user operation, the control unit 109 performs below-described control to each processing unit and performs still display of a video. Further, when an instruction to release the pause processing (a pause release instruction) is input by an external operation, the control unit 109 performs control based on a determination described below so that an input image is reproduced again as a moving image.

Operations of the Video Processing Apparatus 10 when a Pause Instruction is Input Next, operations of the video processing apparatus 10 when an instruction for pause processing (a pause instruction) is input by a user operation are described.

Figure 2:
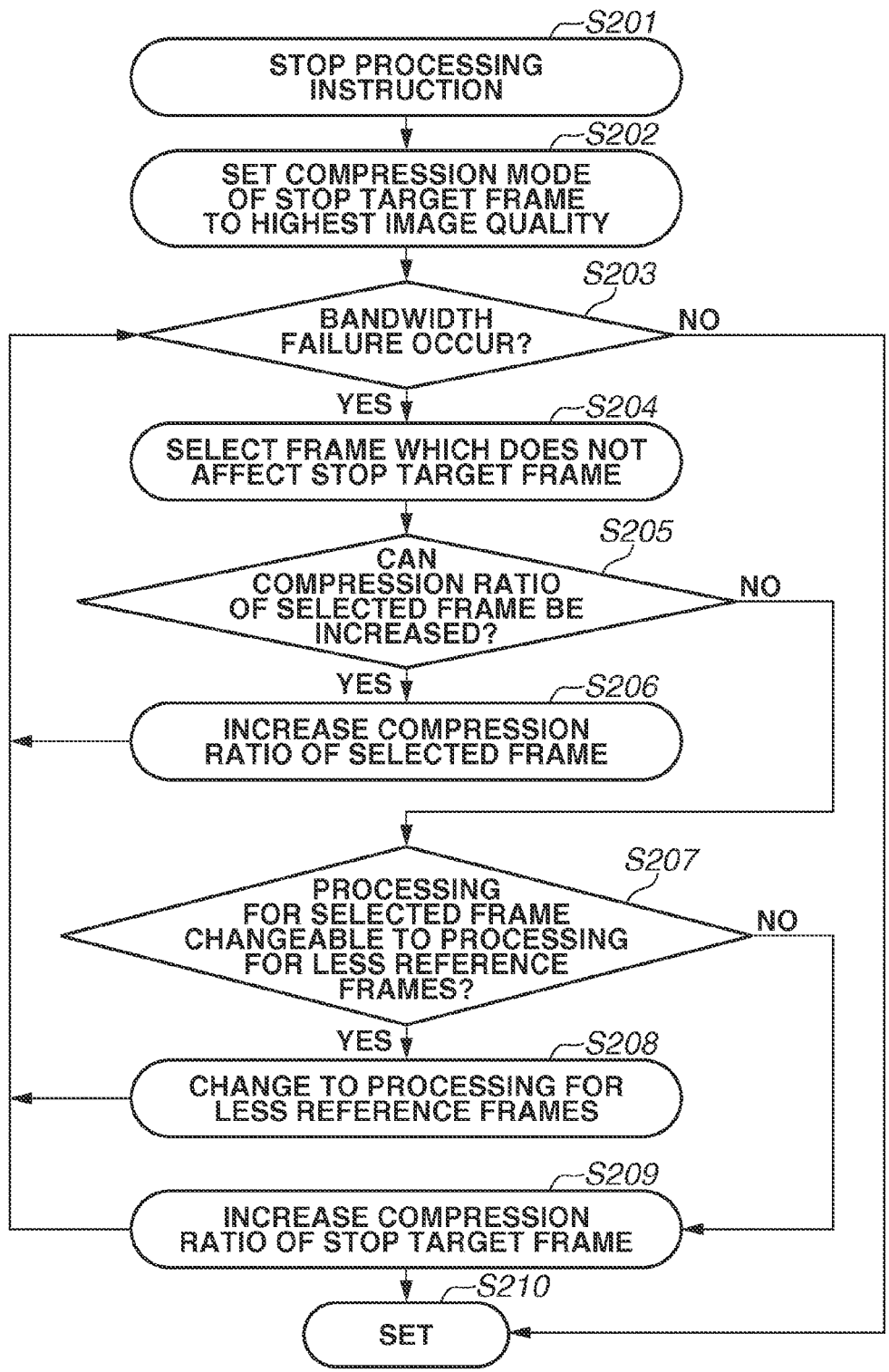
FIG. 2 is a flowchart illustrating operations performed in the video processing apparatus according to the exemplary embodiment.

FIG. 2 is a flowchart illustrating the operations of the video processing apparatus 10 when a pause instruction is input. The input processing unit 101 in the video processing apparatus 10 receives video data from the outside before a pause instruction is input (i.e., input procedures).

FIG. 3 to FIGS. 5A and 5B illustrate changes in data sizes passing through each of the paths 110A to 110M from an input of a pause instruction. The operations of the video processing apparatus 10 when a pause instruction is input are described below with reference to FIG. 2 to FIGS. 5A and 5B.

Figure 3:
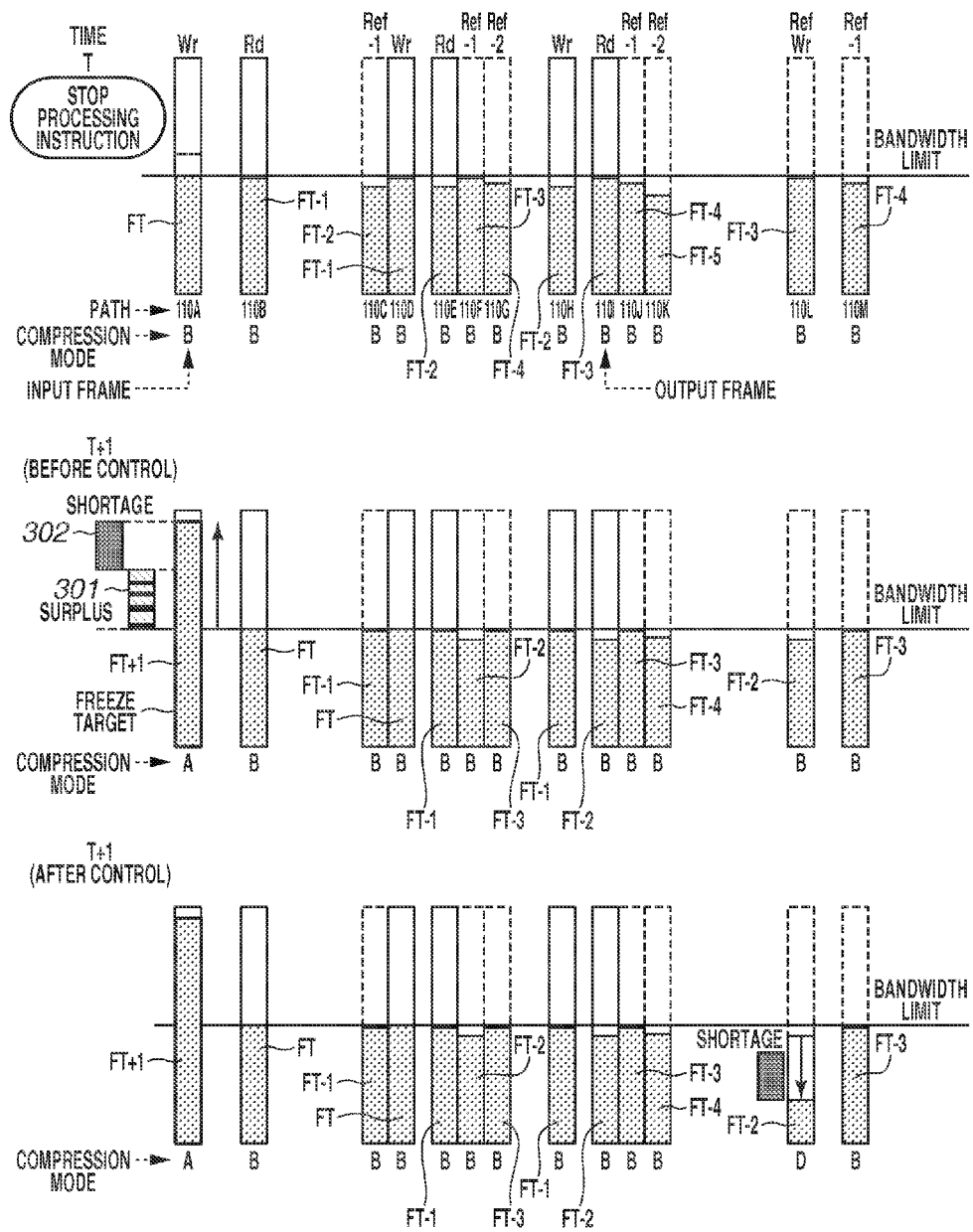
FIG. 3 illustrates data sizes passing through a bus 110 from time T to time T+1.

Time T in FIG. 3 indicates data sizes passing through each of the paths 110A to 110M immediately before a pause instruction input. The video processing apparatus 10 according to the present exemplary embodiment writes and reads video data into and from the memory 111 using each path of the bus 110. In a state at the time T, the compression mode set to each of the compression and decompression units 105 to 108 is the mode B. The data size passing through each of the paths 110A to 110M during display of a moving image varies according a content of a video frame.

Paths labeled "Ref" in FIG. 3 are paths for reading and writing video data as a reference frame, and paths not labeled "Ref" are paths for reading and writing video data as a processing target video frame.

In addition, video frames passing through respective paths are distinguished each other by attaching a symbol "FT**" thereto. For example, a video frame labeled "FT–1" is a video frame which is input to the video processing apparatus 10 at time T–1, and is input to the video processing apparatus 10 one frame prior to a video frame labeled "FT". Further, a video frame labeled "FT–2" is a video frame which is input to the video processing apparatus 10 at time T–2, and is input to the video processing apparatus 10 two frames prior to the video frame labeled "FT".

In FIG. 3, a top of each path indicates a non-compressed data size, and a shaded region indicates a data size of a video frame after compression. Further, in FIG. 3, lines are drawn to indicate that a bandwidth limit is the compression ratio of 50%.

The operations of the video processing apparatus 10 when an instruction for pause processing (a pause instruction) is input at a timing of the time T in FIG. 3 are described with reference to the flowchart in FIG. 2. The video processing apparatus 10 realizes the processing illustrated in FIG. 2 by a central processing unit (CPU), which is not illustrated, reading out a program for realizing the processing illustrated in FIG. 2 from a memory and executing the program.

The video processing apparatus 10 can be implemented as, for example, a large-sized television, a desktop PC, a notebook PC, a tablet, and a smartphone. In addition, the video processing apparatus 10 can be implemented as a projection type device, such as a projector.

The processing in FIG. 2 is started when an instruction for pause processing (a pause instruction) is input during when the video processing apparatus 10 displays a video as a moving image (during non-still display). An instruction for pause processing (a pause instruction) according to the present exemplary embodiment is an instruction to display a still image. When the pause instruction is issued, one of video frames composing a moving image is continuously displayed until a pause release instruction is input. The pause instruction includes instructions to temporarily stop a moving image being displayed, to capture the moving image being displayed, and the like. According to the present exemplary embodiment, a case when a pause instruction is input by a user operation is mainly described as an example. However, the idea of the present invention can be applied to a use case in which a pause instruction is automatically input in a specific situation, for example.

In step S201, the control unit 109 detects that an instruction for pause processing (a pause instruction) is input by an external operation from an instruction unit, which is not illustrated. When the control unit 109 detects a pause instruction, the processing proceeds to step S202. In this description, the pause instruction is detected at the time T. Further, in this description, it is regarded that the compression mode of each of the compression and decompression units 105 to 108 is set to the mode B at the time T. The compression ratio of the mode B is 45% on average and 60% at the worst. In other words, when a video frame is compressed in the mode B, an average data size of the video frame after compression is 45% of that before the compression.

In step S202, the control unit 109 determines a video frame FT+1 input at time T+1 which is a next timing when the pause instruction is detected as a stop target video frame (i.e., a pause frame).

In step S202, the control unit 109 control the video processing on the pause frame FT+1 so that the pause frame FT+1 is displayed in higher image quality than a case that the pause instruction is not detected. In other words, the control unit 109 determines, in step S202, to apply to the pause frame FT+1 video processing of which image quality after the processing is higher among a plurality of types of video processing (for example, compression processing in the modes A to D) which can be executed by each of the processing units 101 to 108. In step S202, the compression mode of the pause frame FT+1 is determined as the mode A. However, the video processing is not limited to the compression processing, and for example, the noise reduction processing can be applied.

Further, in step S202, the control unit 109 calculates a memory bandwidth when the compression mode of the first compression and decompression unit 105 for compressing the video frame FT+1 is switched to the mode A. More specifically, the control unit 109 calculates data sizes of video frames to be read out from and written into the memory 111 via the bus 110 when a video frame subjected to the freeze display is compressed in the mode A and other video frames are compressed in the mode B. The compression ratio of the mode A is 80% on average and 90% at the worst. When the above-described calculation is finished, the processing proceeds to step S203.

In step S203, the control unit 109 determines whether the bandwidth failure of the bus 110 will occur using a calculation result in step S202. More specifically, the control unit 109 determines whether a data amount to be read out from and written into the memory 111 exceeds a predetermined value when the non-pause frame is compressed in the mode B and the pause frame is compressed in the mode A. The predetermined value according to the present exemplary embodiment is a half of a total sum of data sizes of 13 non-compressed video frames which are read and written via the respective paths 110A to 110M. Further, the pause frame is a video frame subjected to the freeze display in response to the pause instruction, the non-pause frame is a video frame not subjected to the freeze display.

If it is determined in step S203 that the bandwidth failure will not occur (NO in step S203), then in step S210, the control unit 109 controls each of the processing units 101 to 108 based on the compression mode and the video processing mode determined in the respective steps. In other words, in step S210, each of the video processing units 102 and 103 performs the video processing on a video frame according to the control from the control unit 109 (i.e., video processing procedures). In addition, in step S210, the output processing unit 104 performs output for displaying a video frame according to the control from the control unit 109 (i.e., output procedures). When the processing in step S210 is finished, the processing returns to step S202 to determine the compression mode and the video processing mode of each video frame at time T+2. According to the present exemplary embodiment, a case when it is determined in step S203 that the bandwidth failure will occur (YES in step S203) is described below.

As indicated at the time T+1 (before control) in FIG. 3, if the compression mode B is used as the compression modes of the non-pause frames other than the video frame FT+1 (the pause frame), an access amount to the memory 111 exceeds the bandwidth limit of the memory 111, and it is determined that failure will occur.

In FIG. 3, a region shaded with oblique lines (a surplus 301) indicates a total sum of margins with respect to the bandwidth limit in each of the paths.

The control unit 109 estimates a data size after compression when the pause frame is compressed in the mode A based on the worst compression ratio (90%) of the mode A. In step S203, the control unit 109 determines whether the estimated data size is equal to or greater than a total sum of a half of the data sizes of the non-compressed video frames and a data size indicated by the surplus 301.

If the estimated data size is equal to or greater than the total sum of the half of the data sizes of the non-compressed video frames and the data size of the surplus 301, the control unit 109 determines that the bandwidth failure will occur (YES in step S203), and the processing proceeds to step S204. On the other hand, if the estimated data size is less than the total sum of the half of the data sizes of the non-compressed video frames and the data size of the surplus 301, the control unit 109 determines that the bandwidth failure will not occur (NO in step S203), and the processing proceeds to step S210.

In FIG. 3, a dark shaded region (a shortage 302) indicates a data size exceeding the bandwidth limit. More specifically, the shortage 302 indicates a value obtained by subtracting the total sum of the half of the data sizes of the non-compressed video frames and the data size of the surplus 301 from the estimated data size of the pause frame compressed in the mode A. Therefore, if the shortage 302 is a positive value, the control unit 109 determines that the bandwidth failure will occur, and if the shortage 302 is a negative value, the control unit 109 determines that the bandwidth failure will not occur.

In the description according to the present exemplary embodiment, the shortage 302 is a positive value as indicated at the time T+1 (before control) in FIG. 3, it is determined that the bandwidth failure will occur, and the processing proceeds to step S204.

In step S204, the control unit 109 specifies a candidate of a video frame to be a change target of the compression mode. The control unit 109 according to the present exemplary embodiment specifies a video frame written via the path 110L as a candidate of a video frame to be a change target of the compression mode. More specifically, among the paths 110A to 110M, paths used for writing video data into the memory 111 are the paths 110A, 110D, 110H, and 110L, and paths used for writing video data of the non-pause frame at the time T+1 are the paths 110D, 110H, and 110L. According to the present exemplary embodiment, among the paths 110D, 110H, and 110L, a video frame corresponding to the path 110L used for writing video data compressed by the fourth compression and decompression unit 108 is specified as a candidate of a change target of the compression mode. It is because that the video data compressed by the fourth compression and decompression unit 108 is only used for the overdrive processing according to the present exemplary embodiment. In the case where the video frame to be written via the path 110L is used in the overdrive processing performed when the pause frame is displayed, it is determined that the compression mode cannot be changed in step S205, thus the compression ratio is not changed. The processing when the compression mode of the video data to be written via the path 110L is not changed is described below in a situation at time T+3.

Thus, in step S204, the control unit 109 specifies a video frame FT-2 to be written via the path 110L as a candidate of a video frame to be a change target of the compression mode so as to reduce the data size passing through the bus 110. When the video frame to be the change target of the compression mode is specified, the processing proceeds to step S205.

In step S205, the control unit 109 determines whether the compression mode of the video frame FT-2 specified in step S204 can be changed. More specifically, the control unit 109 determines whether the compression mode of the video frame FT-2 is already the mode D. In other words, if the compression mode of the video frame FT-2 is already the mode D having a highest compression efficiency (image quality after compression is poor), the data size cannot be reduced by a change in the compression mode, and thus the control unit 109 determines that the compression mode cannot be changed.

Further, in step S205, the control unit 109 determines whether the video frame FT-2 is used as a reference frame when the video processing (processing for improving image quality) is performed on the pause frame. If the compression mode of a reference frame used in the processing for improving image quality of the pause frame is changed, the image quality of the pause frame is deteriorated, and thus the control unit 109 determines that the compression mode cannot be changed. According to the present exemplary embodiment, a video frame which is possibly used as a reference frame of the pause frame FT+1 is a video frame FT. However, not limited to the above, for example, a video frame FT-1 may be used as a reference frame in the processing for improving the image quality of the pause frame FT+1.

In step S205, if the control unit 109 determines that the compression mode of the video frame FT-2 can be changed (YES in step S205), the processing proceeds to step S206, whereas if it is determined that the compression mode cannot be changed (NO in step S205), the processing proceeds to step S207.

In step S206, the control unit 109 changes the compression mode to reduce the data size after compression of the video frame FT-2. According to the present exemplary embodiment, the compression mode of the video frame FT-2 before input of the pause instruction is the mode B. In step S206, the control unit 109 changes the compression mode of the video frame FT-2 to the mode D. In other words, the control unit 109 controls image processing (the compression processing) on the video frame so that image quality for displaying the video frame FT-2 of which display order is prior to the pause frame is lower in the case when the pause instruction is input than the case when the pause instruction is not input. The video frame FT-2 is a video frame which is not yet output from the output processing unit 104 at the time point when the pause instruction is input.

Further, the control unit 109 according to the present exemplary embodiment controls image processing (the compression processing) on the video frame to lower the image quality of the video frame FT-2 which is different from a reference frame referred to by the video processing for the pause frame. The above-described control can increase a possibility to improve the image quality of the pause frame than a case of lowering image quality of a reference frame. The pause frame is a video frame subjected to the freeze display (still display) in response to the pause instruction According to the present exemplary embodiment, the compression mode of the video frame FT-2 is changed from the mode B to the mode D, however, if a value of the shortage 302 is small, the compression mode may be changed from the mode B to the mode C.

The time T+1 (after control) in FIG. 3 indicates data sizes passing through each of the paths 110A to 110M after a change in the compression mode in step S206. As indicated in FIG. 3, the compression mode of the video frame FT-2 compressed by the fourth compression and decompression unit 108 is changed to the mode D. When the mode D is used, the worst data size after the compression is 20% of a non-compressed data size, so that the data size passing through the path 110L used for writing the video data after compression of the video frame FT-2 is reduced. When the control unit 109 changes the compression mode of the video frame in step S206, the processing returns to step S203, and the control unit 109 determines about occurrence of the bandwidth failure.

A reduction amount of the data size by the change in the compression mode of the video frame FT-2 is greater than the shortage 302. Therefore, in step S203, it is determined that the bandwidth failure will not occur (NO in step S203), and the processing proceeds to step S210. In step S210, the control unit 109 controls each of the processing units 101 to 108 to perform compression processing and video processing.

The processing illustrated in FIG. 2 is repeated from when the pause instruction is detected to when display of the pause frame is started. In other words, as indicated at the time T+1 (after control) in FIG. 3, the video processing apparatus 10 performs the video processing according to an operation mode of the time T+1 (after control) which is determined at the time T.

Further, the control unit 109 in the video processing apparatus 10 determines, at the time T+1, an operation mode for the time T+2 according to the flowchart in FIG. 2. However, the processing in step S201 is not performed after the detection of the pause instruction, thus the processing proceeds to step S202.

In step S202, the control unit 109 determines the compression mode of the pause frame FT+1 at the time T+2 to the mode A. Then, in step S203, the control unit 109 determines whether the bandwidth failure occurs. In other words, the control unit 109 determines whether a data amount passing through the bus 110 exceeds the predetermined value based on the compression mode of each of the pause frame and the non-pause frames.

As indicated at the time T+2 (before control) in FIG. 4, the pause frame FT+1 is compressed in the mode A. More specifically, in step S202, the control unit 109 sets the mode A as the compression mode for reading by the first compression and decompression unit 105 and for writing by the second compression and decompression unit 106.

Further, the control unit 109 sets the mode D as the compression mode for reading out the video frame FT−2 by the fourth compression and decompression unit 108 which is compressed in the compression mode D at the time T+1. The compression mode other than that is set to the mode B.

In this condition, a total sum of memory access amounts of each of the compression and decompression units 105 to 108 exceeds the bandwidth limit of the memory 111 (the predetermined value), so that, in step S203, the control unit 109 determines that the bandwidth failure will occur.

Therefore, in step S204, the control unit 109 specifies a video frame to be a candidate of a change target of the compression mode so as to reduce the data size. The control unit 109 according to the present exemplary embodiment specifies a video frame FT+2 which is input later than the pause frame FT+1 as a candidate of a video frame to be a change target of the compression mode. This processing is based on a reason described below.

More specifically, a video frame input later than a video frame subjected to the freeze display has a lower possibility to be output from the output processing unit 104 for display, so that, if a data size thereof is reduced by the change in the compression mode, the reduction causes less deterioration in quality of an output video. In other words, a user may finish display of the video, rewind the video, or instruct a start of a video in a different chapter after the freeze display. Thus, the control unit 109 determines the video frame FT+2 input later than the pause frame FT+1 as a candidate of the video frame to be the change target of the compression mode.

The video frame FT+2 is a video frame which is input later than the input of the pause instruction. Further, the video frame FT+2 is a video frame to be displayed by an input of a freeze release instruction depending on a timing when the freeze release instruction is input.

Then, in step S205, the control unit 109 determines whether the compression mode of the video frame FT+2 can be changed. Since the compression mode of the video frame FT+2 is the mode B, the compression mode can be changed to the mode C or the mode D. In addition, according to the present exemplary embodiment, the video frame FT+2 is not used as a reference frame in the processing for improving the image quality of the pause frame. Therefore, in step S205, the control unit 109 determines that the compression mode of the video frame FT+2 can be changed (YES in step S205). Then, in step S206, the compression mode of the video frame FT+2 is changed from the mode B to the mode D. The control unit 109 according to the present exemplary embodiment changes the compression mode of the video frame FT+2 from the mode B to the mode D. However, the mode can be changed from the mode B to the mode C depending on a size of the shortage 302. When the control unit 109 changes the compression mode of the video frame FT+2 from the mode B to the mode D, the processing returns to step S203, and the control unit 109 determines whether the bandwidth failure occurs.

According to the present exemplary embodiment, it is regarded that if the compression mode of the video frame FT+2 is changed to the mode D, the shortage 302 is a positive value. In other words, if the compression mode of the video frame FT+2 is changed to the mode D, the data size of the video frames to be read out from and written into the memory 111 is equal to or greater than the predetermined value. In this case, the control unit 109 determines in step S203 that the bandwidth failure will occur, and the processing proceeds to step S204.

In step S204, the control unit 109 determines a candidate of a video frame to be a change target of the compression mode other than the video frame FT+2. According to the present exemplary embodiment, the video frame FT−1 which is to be written into the memory 111 via the path 110L is specified as a candidate of a video frame to be a change target of the compression mode.

More specifically, the control unit 109 specifies the video frame FT−1 to be written via the path 110L among the paths 110A, 110D, 110H, and 110L for data writing as a candidate of the change target of the compression mode.

Then, in step S205, the control unit 109 determines that the compression mode of the video frame FT−1 can be changed. Since the compression mode of the video frame FT−1 is the mode B, the compression mode can be changed. In addition, according to the present exemplary embodiment, the video frame FT−1 is not used as a reference frame in the processing for improving the image quality of the pause frame FT+1. Thus, in step S205, the control unit 109 determines that the compression mode of the video frame FT−1 can be changed (YES in step S205). Then, in step S206, the compression mode of the video frame FT−1 is changed from the mode B to the mode D.

Accordingly, when reading and writing data sizes to the memory 111 via the bus 110 become less than the predetermined value, in step S203, it is determined that the bandwidth failure will not occur, and the processing proceeds to step S210. Then, in step S210, the control unit 109 controls each of the processing units 101 to 108 to perform compression processing and video processing.

As indicated at the time T+2 (before control) and the time T+2 (after control) in FIG. 4, the compression modes of the video frame FT+2 and the video frame FT−1 which are respectively written via the path 110A and the path 110L are changed from the mode B to the mode D. Accordingly, the pause frame can be displayed in the good quality while avoiding the bandwidth failure of the memory 111. The video processing apparatus 10 performs the video processing at the time T+2 according to the operation mode determined at the time T+1, and also determines an operation mode at the time T+3.

At the time T+3, if the compression mode of a video frame FT+3 is set to the mode D, a memory access as indicated at the time T+3 (before control) in FIG. 4 is performed. As a result, reading and writing data sizes to the memory 111 slightly exceeds the bandwidth limit of the memory 111. Therefore, in step S204, the control unit 109 specifies a candidate of a video frame to be a change target of the compression mode to reduce the data size. In step S204, the control unit 109 according to the present exemplary embodiment specifies the video frame FT to be written via the path 110L as a candidate of the change target of the compression mode, and the processing proceeds to step S205.

In step S205, the control unit 109 determines whether the compression mode of the video frame FT specified in step S204 can be changed. Since the compression mode of the video frame FT is the mode B, the compression mode can be changed to the mode C or the mode D. However, the video frame FT to be written via the path 110L is a video frame used in the overdrive processing performed when the pause frame FT+1 is output.

In other words, if the compression mode of the video frame FT is changed to the mode D, the video frame compressed in the mode D is used as a reference frame of the pause frame FT+1 at time T+4. If the overdrive processing is performed on the pause frame by using the video frame FT compressed in the mode D as a reference frame, a response speed when the pause frame is displayed may be possibly deteriorated. Thus, in step S205, the control unit 109 according to the present exemplary embodiment determines that the compression mode cannot be changed (NO in step S205), and the processing proceeds to step S207.

In step S207, the control unit 109 determines whether a video processing mode of a video frame subjected to the video processing by reading out the pause frame as a reference frame. In this example, the control unit 109 determines whether contents of the video processing performed on the video frame FT+2 can be changed to video processing which can be executed without using the pause frame. However, the control unit 109 may determine whether the video processing using the pause frame performed on the video frame FT+2 can be turned off. If it is determined that the video processing mode of the video frame FT+2 can be changed (or can be turned off, i.e., YES in step S207), the processing proceeds to step S208.

In step S208, the control unit 109 limits data of the pause frame to pass through the bus 110 as a reference frame for the video processing performed on the video frame FT+2 which is input later than the pause frame. Accordingly, the data size passing through the bus 110 can be reduced. At that time, the control unit 109 changes the video processing mode for the video frame FT+2 (or turns off the video processing).

A reason for changing the video processing performed on the video frame FT+2 using the pause frame is described below. Specifically, the pause frame used as a reference frame is compressed in the mode A and has a large data size. However, the video frame FT+2 to be a video processing target is basically compressed in the mode D, so that the image quality thereof is already deteriorated. If the video frame FT+2 compressed in the mode D is subjected to the video processing using the video frame compressed in the mode A, an effect of improving the image quality is insignificant. In addition, a possibility that the video frame FT+2 input later than the pause frame is output by the output processing unit 104 to be displayed is lower than that of a video frame input prior to the pause frame. Therefore, the control unit 109 limits the pause frame to be read out from the memory 111 as a reference frame for the video processing performed on the video frame FT+2 which is input later than the pause frame.

The video processing apparatus 10 performs the video processing at the time T+3 according to the operation mode at the time T+3 (after control) which is determined and set at the time T+2. Further, the control unit 109 determines, at the time T+3, an operation mode of the time T+4.

As illustrated in FIG. 5A, the time T+4 is a timing when the pause frame FT+1 is output from the output processing unit 104. In other words, the freeze display is started from the time T+4. The control unit 109 realizes the freeze display by controlling each processing unit so that the pause frame FT+1 read out from the memory 111 by the second video processing unit 103 is continuously output from the output processing unit 104. Further, the control unit 109 controls the second video processing unit 103 so that the video frames FT−1, FT, and FT+1 used for the freeze display are not to be overwritten.

The pause frame FT+1 is constantly compressed in the compression mode A from when being input at the time T+1 to when being output at the time T+4, and a video frame compressed in the compression mode B is used as a reference frame. The video processing targeting to the pause frame is also performed. Thus, the image quality of the video frame subjected to the freeze display is improved than a case where, for example, all video frames including the pause frame are compressed in the mode B to perform the freeze display.

Figure 5B:
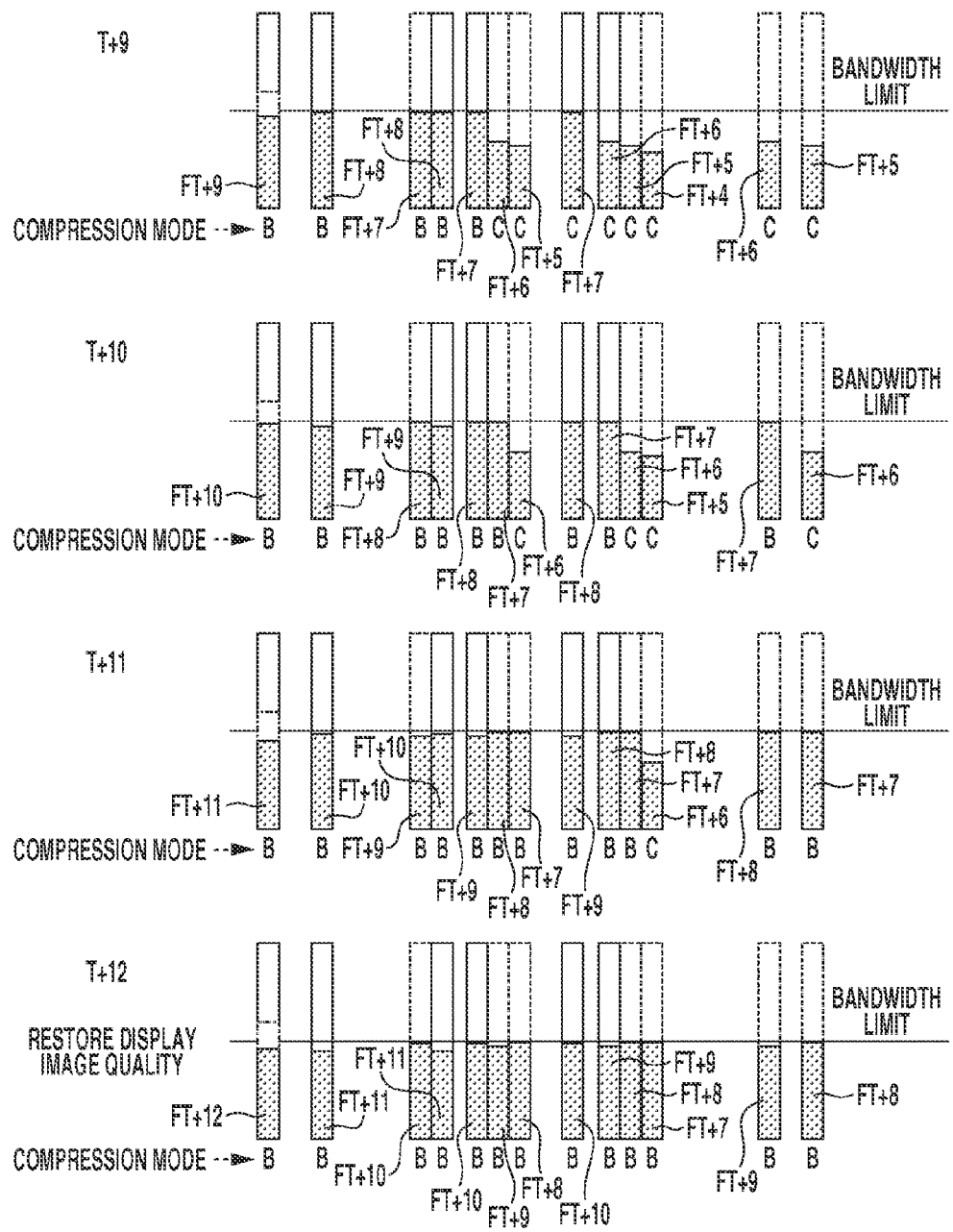

Next, processing performed when the still display (the freeze display) is released is described with reference to FIGS. 5A and 5B. Time T+5 in FIG. 5A indicates a state that the pause frame FT+1 is displayed (a freeze display state). At time T+6, an instruction to release the pause processing (a pause release instruction) is input to the control unit 109 by an external operation or the like.

When the freeze release instruction is input at the time T+6, the control unit 109 determines an operation mode of each processing unit at time T+7 during a time period from a start of the time T+6 until the time T+7. More specifically, the control unit 109 determines to change a video frame read out by the second video processing unit 103 at the time T+7 from the video frame FT+1 to a video frame FT+4. Accordingly, the still display (the freeze display) is released.

In addition, the control unit 109 changes a reference frame read out for the video processing from the memory 111 by the second video processing unit 103. Accordingly, the data size of the paths 110I to 110L is reduced than that at the time T+6. A reduced amount of the data size of the paths 110I to 110L is assigned to compression of a video frame FT+7 which is input to the video processing apparatus 10 after the input of the freeze release instruction. More specifically, the control unit 109 sets the compression mode of the video frame FT+7 to the mode B.

The compression mode can be changed to lower the compression ratios of other video frames FT+2 to FT+6. However, even if a video frame which has been once compressed in a high compression ratio and of which image quality is deteriorated is compressed in a low compression ratio, the deteriorated image quality cannot be restored. Therefore, according to the present exemplary embodiment, the compression mode of the video frame which is input before the freeze release instruction is not changed. Accordingly, a result is obtained as indicated at the time T+7 in FIG. 5A.

In other words, the control unit 109 compresses the video frame FT+4 (a first video frame) to be displayed in response to the input of the freeze release instruction in the compression mode C (a first compression ratio). On the other hand, the control unit 109 compresses the video frame FT+7 which is input to the video processing apparatus 10 after the input of the freeze release instruction in the compression mode B (a second compression ratio). As described above, the control unit 109 compresses the video frame FT+7 which is input after the input of the freeze release instruction at the compression ratio lower than the compression ratio of the video frame FT+4.

As with the case of the time T+7, after time T+8, the control unit 109 also changes a compression mode of a video frame input after the time T+7 to the compression mode B. Time T+12 in FIG. 5B indicates a state that all of video frames to be read out from and written into the memory 111 become video frames compressed in the mode B. In the above descriptions, a case where the compression mode of the video frames which are input after the input of the pause instruction are all set to the mode B is described as an example. However, the present exemplary embodiment is not limited to the example. In other words, depending on a content of a video frame, compression in the mode B may possibly cause the bandwidth failure of the memory 111. When the control unit 109 determines that the bandwidth failure will occur based on the worst compression ratio of the mode B and a data size of a compressed video frame, the control unit 109 sets a compression mode of a video frame to be newly input to the mode C or the mode D.

According to the present exemplary embodiment, a case where the compression mode of the video frame FT+1 determined as the pause frame is set to the mode A to improve the image quality of the pause frame is mainly described as an example. However, a method for improving the image quality of the pause frame is not limited to the control of the compression mode. The control unit 109 can change contents of the video processing with respect to the pause frame performed by the video processing unit 102 or 103 according to an input of the pause instruction. For example, with respect to the pause frame, noise reduction processing of which processing load is higher than the other video frames can be performed. Further, for example, with respect to the pause frame, video processing of which number of reference frames are greater than the other video frames can be performed. In other words, the control unit 109 can control the number of reference frames used in the video processing performed on a video frame so that the number of reference frames used in the video processing performed on the pause frame becomes greater than that of when the freeze display is not performed. According to the above-described processing, the image quality of the video frame subjected to the freeze display can be improved.

Next, a second exemplary embodiment is described with reference to FIGS. 6 to 10. According to the present exemplary embodiment, differences from the first exemplary embodiment are mainly described.

Operations of the video processing apparatus 10 according to the present exemplary embodiment are described with reference to FIG. 6. The video processing apparatus 10 realizes the processing illustrated in FIG. 6 by a CPU, which is not illustrated, reading out a program for realizing the processing illustrated in FIG. 6 from a memory and executing the program.

The video processing apparatus 10 can be implemented as, for example, a large-sized television, a desktop PC, a notebook PC, a tablet, and a smartphone. In addition, the video processing apparatus 10 can be implemented as a projection type device, such as a projector.

The processing in FIG. 6 is started when an instruction for pause processing (a pause instruction) is input during when the video processing apparatus 10 displays a video as a moving image (during non-still display). An instruction for pause processing (a pause instruction) according to the present exemplary embodiment is an instruction to freeze a display video. When the pause instruction is issued, one of video frames composing a moving image is continuously displayed until a freeze release instruction is input. The pause instruction includes instructions to temporarily stop a moving image being displayed, to capture the moving image being displayed, and the like. According to the present exemplary embodiment, a case when a pause instruction is input by a user operation is mainly described as an example. However, the idea of the present invention can be applied to a use case in which a pause instruction is automatically input in a specific situation, for example.

In step S601, the control unit 109 detects that an instruction for pause processing (a pause instruction) is input by an external operation from an instruction unit, which is not illustrated. When the control unit 109 detects a pause instruction, the processing proceeds to step S602. In this description, the pause instruction is detected at time T in FIG. 7. Further, in this description, it is regarded that the compression mode of each of the compression and decompression units 105 to 108 is set to the mode B at the time T. The compression ratio of the mode B is 45% on average and 60% at the worst. In other words, when a video frame is compressed in the mode B, an average data size of the video frame after compression is 45% of that before the compression.

In step S602, the control unit 109 determines a video frame FT+1 input at time T+1 which is a next timing when the pause instruction is detected as a stop target video frame (i.e., a pause frame). Further, in step S602, the control unit 109 determines the compression mode of the pause frame as the mode A so that image quality of the pause frame is improved than a case that the pause instruction is not detected. Furthermore, in step S602, the control unit 109 calculates data sizes of video frames to be read out from and written into the memory 111 via the bus 110 when a video frame subjected to the freeze display is compressed in the mode A and other video frames are compressed in the mode B. The compression ratio of the mode A is 80% on average and 90% at the worst. When the above-described calculation is finished, the processing proceeds to step S603.

In step S603, the control unit 109 determines whether the bandwidth failure of the bus 110 will occur using a calculation result in step S602. More specifically, the control unit 109 determines whether the data size to be read out from and written into the memory 111 exceeds a predetermined value when the non-pause frame is compressed in the mode B and the pause frame is compressed in the mode A. The predetermined value according to the present exemplary embodiment is a half of a total sum of data sizes of 13 non-compressed video frames which are read and written via the respective paths 110A to 110M.

Figure 7:
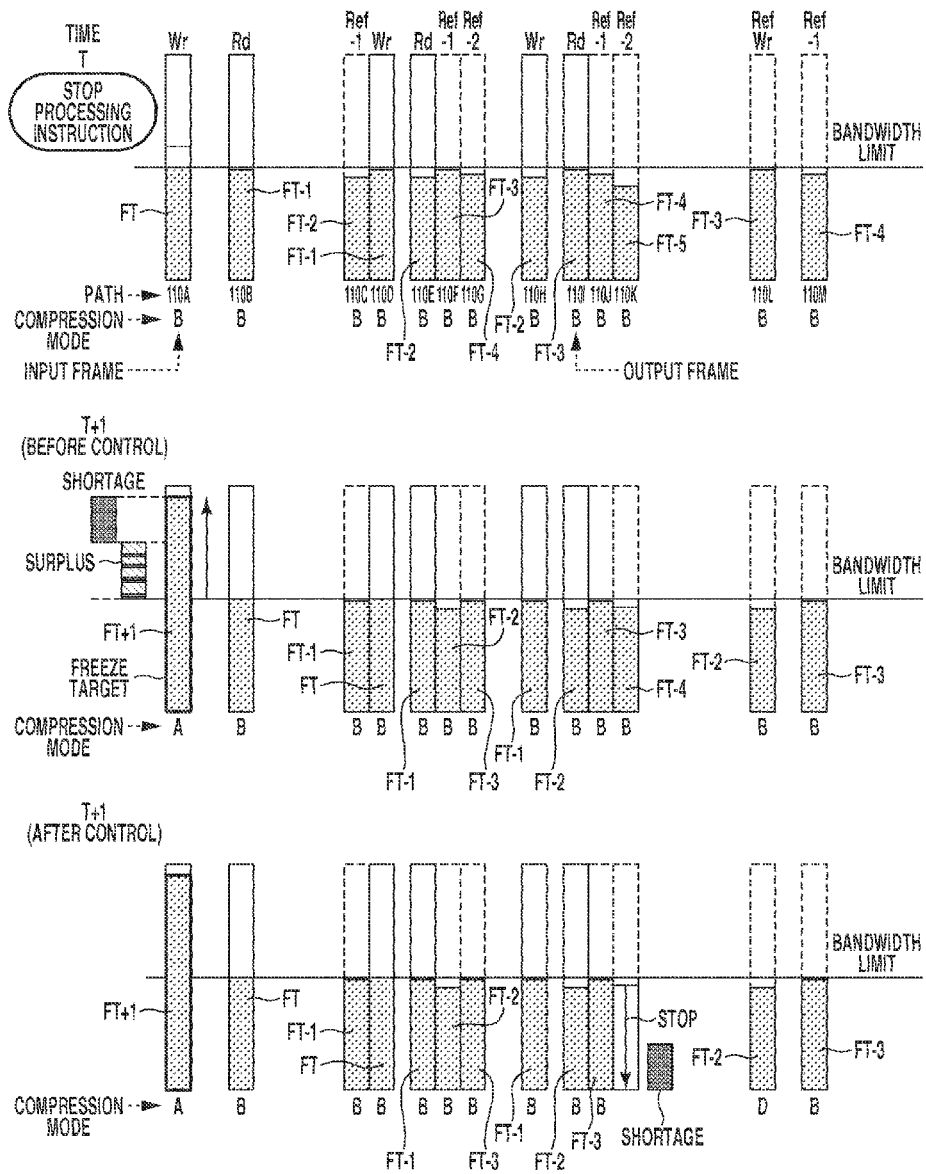
FIG. 7 illustrates data sizes passing through a bus 110 from time T to time T+1.

In step S603, if it is determined that the bandwidth failure will not occur (NO in step S603), the processing proceeds to step S610. In step S601, the pause frame is compressed in the mode A, the non-pause frame is compressed in the mode B, and the compressed frames are written into the memory 111. When the processing in step S610 is finished, the processing returns to step S602 to determine the compression mode and others of each video frame at the time T+2. According to the present exemplary embodiment, a case when the control unit 109 determines in step S603 that the bandwidth failure will occur (YES in step S603) is described below. FIG. 7 indicates data sizes passing through the respective paths 110A to 110M and the compression modes of the respective compression and decompression units 105 to 108 at the time T according to the present exemplary embodiment. At the time T, a pause instruction is input to the control unit 109 from the outside.

At time T+1 (before control) in FIG. 7, the control unit 109 determines, in step S602, the video frame FT+1 as a stop target video frame (the pause frame), and the compression mode of the video frame (the pause frame) FT+1 to the mode A. Accordingly, the data size passing through the bus 110 is increased, and "shortage" is caused as indicated at the time T+1 (before control) in FIG. 7, so that, in step S603, the control unit 109 determines that the bandwidth failure will occur (YES in step S603).

Then, in step S604, the control unit 109 specifies a video frame used as a reference frame in the video processing by the second video processing unit 103 as a candidate of a video frame to be a reduction target of a data size so as to reduce the data size passing through the bus 110.

More specifically, the control unit 109 specifies a video frame used as a reference frame by the second video processing unit 103 as a candidate of the reduction target of the data size. In this regard, the second video processing unit 103 does not perform the video processing on the pause frame between the first video processing unit 102 and the second video processing unit 103. According to the present exemplary embodiment, a video frame FT−4 read out via the path 110K is specified as a candidate of a video frame to be the reduction target of the data size. When a candidate of a video frame to be the reduction target of the data size is specified, the processing proceeds to step S605.

In step S605, the control unit 109 determines whether the video processing mode currently executed by the second video processing unit 103 can be changed to the video processing mode which does not use the video frame specified in step S604 as a reference frame. The control unit 109 according to the present exemplary embodiment determines that the video processing mode can be changed if a video processing target of the second video processing unit 103 is not the pause frame.

At the time T+1, the video frame as the video processing target of the second video processing unit 103 is not the pause frame FT+1 but the video frame FT−2. Therefore, the control unit 109 determines in step S605 that the video processing mode of the second video processing unit 103 can be changed. If the control unit 109 determines that the video processing mode can be changed (YES in step S605), the processing proceeds to step S606.

In step S606, the control unit 109 changes the video processing mode of the second video processing unit 103 to a video processing mode which uses a low number of reference frames. As illustrated in FIG. 7, if the processing in step S606 is not executed, two video frames (video frames FT−3 and FT−4) are used as the reference frames in the video processing by the second video processing unit 103. However, by the processing in step S606, the video frame FT−4 is not used as the reference frame. In other words, by the processing in step S606, the second video processing unit 103 stops reading out the video frame FT−4 via the path 110K. Accordingly, the data size of video data passing through the bus 110 can be reduced.

When the change in the video processing mode is finished in step S606, the processing returns to step S603, and the control unit 109 again determines whether the bandwidth failure occurs. As indicated at the time T+1 (after control) in FIG. 7, a data size reduced by bringing the data size passing through the path 110K to zero is greater than the data size of the "shortage", thus the control unit 109 determines that the bandwidth failure will not occur. In step S603, if it is determined that the bandwidth failure will not occur (NO in step S603), the processing proceeds to step S610. In step S610, the control unit 109 controls each of the video processing and the compression processing based on the determination in each step in FIG. 6. When the control in step S610 is finished, the processing returns to step S603, and the control unit 109 determines each operation mode at the time T+2.

The time T+2 (before control) in FIG. 8 indicates a data size of video data passing through each of the paths 110A to 110M at the time T+2 in the case that the control based on the flowchart in FIG. 6 is not performed. As illustrated in FIG. 8, reading and writing of the pause frame is performed in two paths, so that the data size passing through the bus 110 exceeds the predetermined value.

"Shortage" exists in a state at the time T+2 (before control) in FIG. 8, the control unit 109 determines in step S603 in FIG. 6 that the bandwidth failure will occur. Then, the processing proceeds to step S604, and the control unit 109 specifies a video frame which has a small influence on the pause frame as a candidate of the reduction target of the data size. According to the present exemplary embodiment, the video frame FT+2 is specified which is input later than the pause frame FT+1.

Then, in step S605, the control unit 109 determines whether the video processing mode performed on the video frame FT+2 can be changed to the video processing mode which uses a low number of reference frames. However, the video frame FT+2 is a video frame in a state that is input from the input processing unit 101, and the control unit 109 determines that the video processing cannot be changed (NO in step S605). Thus, the processing proceeds to step S607, and the control unit 109 determines whether the compression ratio of the video frame FT+2 can be changed. The compression mode of the video frame FT+2 before the change is the mode B, and there is no intention of using the video frame FT+2 as a reference frame in the video processing performed on the pause frame FT+1, so that it is determined that the compression ratio can be changed. Thus, in step S608, the control unit 109 controls the first compression and decompression unit 105 so that the compression mode of the video frame FT+2 is changed from the mode B to the mode D. When the processing in step S608 is finished, the processing returns to step S603.

The data size passing through the bus 110 will not become less than the predetermined value only by changing the compression mode of the video frame FT+2, thus the control unit 109 determines in step S603 that the bandwidth failure will occur (YES in step S603), and the processing proceeds to step S604.

In step S604, the control unit 109 specifies the video frame FT−3 used as a reference frame in the video processing by the second video processing unit 103 as a candidate of the reduction target of the data size. Then, in step S605, the control unit 109 determines whether the video processing mode of the second video processing unit 103 can be changed. The video frame to be a video processing target of the second video processing unit 103 at the time T+2 is not the pause frame FT+1 but the video frame FT−1, so that the control unit 109 determines that the video processing mode can be changed. In step S606, the control unit 109 changes the video processing mode of the second video processing unit 103. When the change in the video processing mode is finished, the processing returns to step S603.

When the control unit 109 determines that the bandwidth failure will not occur by the change in the compression mode of the video frame FT+2 and the change in the video processing mode of the second video processing unit 103, the processing proceeds to step S610, and the control unit 109 causes each of the processing units 101 to 108 to perform processing at the time T+2. The data size passing through each of the paths 110A to 110M at the time T+2 after the control is indicated at the time T+2 (after control) in FIG. 8.

Further, the control unit 109 returns the processing to step S603 to determine an operation mode of each processing unit at the time T+3. The data size passing through each of the paths 110A to 110M at the time T+3 is indicated at the time T+3 (before control) in FIG. 8. As illustrated in FIG. 8, reading and writing of three pause frames are simultaneously performed, and "shortage" is caused, so that it is determined that the bandwidth failure will occur. In this case, in step S604, the control unit 109 specifies the pause frame FT+1 which is read out via the path 110C as a reference frame for the video processing performed on the video frame FT+2 as a reduction target of the data size, and changes the video processing mode of the first video processing unit 102. Accordingly, the pause frame FT+1 is not read out via the path 110C, and the data size passing through the bus 110 can be reduced.

A reason for specifying the pause frame FT+1 read out via the path 110C as the reduction target of the data size is described below. Specifically, even if the video frame FT+2 which has already been compressed in the mode D and of which image quality is lowered is subjected to the video processing using a high quality reference image compressed in the mode A, and compressed again in the mode D, an effect of improving the image quality is insignificant. In addition, the video frame FT+2 is a frame immediately after the video frame FT+1 as the stop target, a possibility that the video frame FT+2 is output to be displayed is low. Therefore, the video processing mode of the first video processing unit 102 is changed to the video processing mode which does not use a reference frame, and reading out via the path 110C is stopped.

As indicated at the time T+4 (before control) in FIG. 9, it is determined in step S603 that there is a shortage of the memory bandwidth before the control in FIG. 6 and the bandwidth failure will also occur at the time T+4. Thus, the control unit 109 changes the video processing mode of the video frame FT+2 which is compressed in the low quality. Accordingly, the pause frame FT+1 and the video frame FT are not read out as reference frames for the video processing performed on the video frame FT+2, and the data size passing through the bus 110 can be reduced. In other words, the control unit 109 changes the video processing mode of the first video processing unit 102 by the processing in steps S605 and S606, and stops reading out of a reference frame using the path 110F and the path 110G. As a result, the data size passing through the bus 110 is reduced, and it is determined that the bandwidth failure will not occur, as indicated at the time T+4 (after control) in FIG. 9. In step S603, if the control unit 109 determines that the bandwidth failure will not occur (NO in step S603), the processing proceeds to step S610, and the control unit 109 controls each processing unit to realize the video processing and the compression processing at the time T+4. The time T+4 is a timing at which the pause frame FT+1 is read out via the path 110I and output from the output processing unit 104. The control unit 109 controls each of the processing units 101 to 108 so that the pause frame FT+1 is continuously displayed from the time T+4 until a freeze release instruction to release the freeze display is input. Further, the control unit 109 controls the memory 111 not to delete the pause frame FT+1 therefrom during the freeze display.

At time T+5, a display screen is in a still state, the pause frame FT+1 is read out via the path 110I again.

As indicated at the time T+5 (before control) in FIG. 9, if the control illustrated in FIG. 6 is not performed, the bandwidth failure will occur. Thus, in step S603, the control unit 109 determines that the bandwidth failure will occur. Then, in step S604, a candidate of a reduction target of a data size is specified. The control unit 109 specifies the video frames FT, FT−1, FT+1, and FT+1 respectively read out via the paths 110J, 110K, 110L, and 110M as candidates of video frames to be the reduction targets of the data size.

A reason for the processing is described below. Specifically, according to the present exemplary embodiment, the second video processing unit 103 performs the frame rate conversion processing, and the output processing unit 104 performs the overdrive processing, however, performing these processing does not affect the quality of a displayed video during the pause processing (the pause display). Therefore, the control unit 109 performs control to limit (prohibit) reading of a reference frame by the second video processing unit 103 and the output processing unit 104. Accordingly, the data size passing through the bus 110 can be reduced to a level in which the bandwidth failure will not occur as indicated at the time T+5 (after control) in FIG. 9.

Next, operations of the video processing apparatus 10 when a freeze release instruction for releasing the pause processing (the pause display) is input is described below. According to the present exemplary embodiment, a freeze release instruction is detected at the time T+6. According to the present exemplary embodiment, a case when a freeze release instruction is input by a user operation is mainly described as an example. However, the idea of the present invention can be applied to a use case in which a freeze release instruction is automatically input in a specific situation, for example.

As indicated at the time T+7 (before control) in FIG. 10, in response to the detection of the freeze release instruction, the control unit 109 changes the video processing modes of the second video processing unit 103 and the output processing unit 104 to release the freeze display. In other words, the control unit 109 restarts the frame rate conversion processing and/or the overdrive processing in response to the input of the freeze release instruction. As a result, bandwidths are required for the second video processing unit 103 and the output processing unit 104 to read out reference frames, and the data size passing through the bus 110 increases. Therefore, it is determined by the control unit 109 that the bandwidth failure will occur. In step S604, the control unit 109 thus specifies the video frames FT+2 and FT+3 respectively read out via the paths 110J and 110K as video frames of the reduction target of the data size. Then, in step S605, the control unit 109 turns off the video processing (the frame rate conversion processing) by the second video processing unit 103 to limit (prohibit) reading of the video frames FT+2 and FT+3 specified in step S604. This processing is based on a reason described below.

Specifically, the pause frame FT+1 which has been output and the video frame FT+4 which is first output after the input of the freeze release instruction are not temporally continuous, so that the necessity for generating and displaying an intermediate frame by the frame rate conversion processing is low. Thus, the control unit 109 according to the present exemplary embodiment limits the frame rate conversion processing immediately after the input of the freeze release instruction to reduce the data size passing through the bus 110.

At time T+8, normal processing is started by returning from the pause processing. For example, as indicated at the time T+8 in FIG. 10, in the case that the data sizes of the paths 110C, 110E, and 110K are large, and a video frame FT+8 via the path 110A is compressed in the mode B, if it is determined by the control unit 109 that the bandwidth failure will occur, the compression mode of the video frame FT+8 is changed to the mode C. Further, the control unit 109 changes the compression modes of the video frames FT+7 and FT+6 respectively written via the path 110D and the path 110H from the mode B to the mode C. Accordingly, the bandwidth failure of the bus 110 can be avoided. As described above, the video processing apparatus 10 according to the present exemplary embodiment controls the compression mode to improve the image quality of the pause frame (the video frame subjected to the freeze display) in response to the input of the pause instruction. In addition, the video processing apparatus 10 controls the compression mode and/or the video processing mode of the non-pause frame so that reading and writing data sizes with respect to the memory 111 which stores compressed video data becomes less than the predetermined value. The video processing apparatus 10 according to the present exemplary embodiment can realize display of the pause frame in the high quality while preventing the bandwidth failure of the memory 111.

According to the present exemplary embodiment, a case when the still display (the freeze display) is performed is mainly described as an example. However, the contents of the present invention can be applied to, for example, processing for capturing a display screen to output to other devices.

According to the present invention, quality of a video to be displayed in response to a pause instruction can be improved.

OTHER EMBODIMENTS

Embodiments of the present invention can also be realized by a computer of a system or apparatus that reads out and executes computer executable instructions recorded on a storage medium (e.g., non-transitory computer-readable storage medium) to perform the functions of one or more of the above-described embodiments of the present invention, and by a method performed by the computer of the system or apparatus by, for example, reading out and executing the computer executable instructions from the storage medium to perform the functions of one or more of the above-described embodiments. The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-216480 filed Oct. 17, 2013, which is hereby incorporated by reference herein in its entirety.

What is claimed is:

1. An image display apparatus configured to display a video, the image display apparatus comprising:
    an inputter for inputting a video frame constituting the video;
    a video compressor for performing compression processing on the input video frame; and
    a controller for (1) determining, in response to an input of a pause instruction to temporarily stop a display of the video, a target video frame to be displayed during temporary stop by the pause instruction, and for (2) controlling a compression ratio of the compression processing performed by the video compressor of the target video frame, so that image quality of the target video frame to be displayed during temporary stop is higher than image quality of the target video frame displayed during non-temporary stop in a case where the pause instruction is not input during the display of the video.

2. The image display apparatus according to claim 1, wherein the controller controls a compression ratio of one or more video frames which are prior to the target video frame in a display order so that image quality of the one or more video frames becomes lower than image quality of the one or more video frames in the case where the pause instruction is not input.

3. The image display apparatus according to claim 1, wherein the controller controls a compression ratio of one or more non-reference frames which are not referred to by compression processing on the target video frame so that image quality of the one or more non-reference frames becomes lower than image quality of the one or more non-reference frames in the case where the pause instruction is not input.

4. The image display apparatus according to claim 1, wherein the controller controls a compression ratio of a first video frame which is prior to a second video frame in a display order so that image quality of the first video frame becomes lower than image quality of the first video frame in the case where the pause instruction is not input, and wherein the first and the second video frames are prior to the target video frame to be displayed during the temporary stop in the display order.

5. The image display apparatus according to claim 1, wherein the controller controls compression ratio of a following video frame which is input by the inputter later than the input of the pause instruction and is displayed in response to an input of a release instruction to release the temporary stop so that image quality of the following video frame becomes lower than image quality of the following video frame in the case where the pause instruction is not input.

6. The image display apparatus according to claim 1, wherein the controller controls a number of reference frames used in video processing on the target video frame to be displayed during the temporary stop so that the image quality of the target video frame to be displayed during the temporary stop becomes higher than the image quality of the target video frame in a case where the pause instruction is not input.

7. The image display apparatus according to claim 1, wherein the controller controls a compression ratio of first and second video frames so that a compression ratio of the first video frame which is input in a time period from the input of the pause instruction to an input of a release instruction to release the temporary stop becomes lower than a compression ratio of the second video frame which is first input after the input of the release instruction.

8. The image display apparatus according to claim 1, further comprising
a memory configured to store the compressed video frame obtained by the video compressor,
wherein the controller is configured to control a compression ratio of one or more video frames other than the target video frame so that memory access amount for storing the one or more compressed video frame is reduced, and to control a compression ratio of the target video frame according to the reduced memory access amount.

9. An image display apparatus configured to display a video, the image display apparatus comprising:
an inputter for inputting a video frame constituting the video;
a video processor for performing at least one type of video processing among a plurality of types of video processing on the input video frame; and
a controller for (1) determining, in response to an input of a pause instruction to temporarily stop a display video, a target video frame to be displayed during temporary stop by the pause instruction, and for (2) determining a type of video processing that the video processor performs on the target video frame from among the plurality of types of video processing, so that image quality of the target video frame on which the determined type of video processing is performed and displayed during temporary stop in response to the pause instruction is higher than image quality of the target video frame displayed during non-temporary stop in a case where the pause instruction is not input during the display video.

10. The image display apparatus according to claim 9, wherein
the controller determines that the video processor performs first type video processing on the target video frame to be displayed during the temporary stop and determines that the video processor performs second type video processing on a video frame which is input next to the target video frame to be displayed during the temporary stop.

11. The image display apparatus according to claim 9, further comprising
a memory configured to store the compressed video frame obtained by the video compressor,
wherein the controller is configured to control a type of video processing for one or more video frames other than the target video frame so that memory access amount related to the one or more compressed video frame is reduced, and to control a type of the video processing for the target video frame according to the reduced memory access amount.

12. A method for controlling an image display apparatus configured to display a video, the method comprising:

inputting a video frame constituting the video;
performing compression processing on the input video frame as video processing; and
(1) determining, in response to an input of a pause instruction to temporarily stop a display of the video, a target video frame to be displayed during temporary stop by the pause instruction, and for (2) controlling a compression ratio of the compression processing of the target video frame, so that image quality of the target video frame to be displayed during temporary stop is higher than image quality of the target video frame displayed during non-temporary stop in a case where the pause instruction is not input during the display of the video.

13. The method according to claim 12, further comprising controlling a compression ratio of one or more video frames which are prior to the target video frame in a display order so that image quality of the one or more video frames becomes lower than image quality of the one or more video frames in the case where the pause instruction is not input.

14. The method according to claim 12, further comprising controlling a compression ratio of one or more non-reference frames which are not referred to by compression processing on the target video frame so that image quality of the one or more non-reference frames becomes lower than image quality of the one or more non-reference frames in the case where the pause instruction is not input.

15. A method for controlling an image display apparatus configured to display a video, the method comprising:
inputting a video frame constituting the video;
performing at least one type of video processing among a plurality of types of video processing on the input video frame; and
(1) determining, in response to an input of a pause instruction to temporarily stop a display video, a target video frame to be displayed during temporary stop by the pause instruction, and for (2) determining a type of video processing to be performed on the target video frame from among the plurality of types of video processing, so that image quality of the target video frame on which the determined type of video processing is performed and displayed during temporary stop in response to the pause instruction is higher than image quality of the target video frame displayed during non-temporary stop in a case where the pause instruction is not input during the display video.

16. The method according to claim 15, further comprising:
determining to perform first type video processing on the target video frame to be displayed during the temporary stop and determining to perform second type video processing on a video frame which is input next to the target video frame to be displayed during the temporary stop.

17. A storage medium storing a program for causing a computer to operate as an image display apparatus configured to display a video, the program comprising:
inputting a video frame constituting the video;
performing compression processing on the input video frame as video processing; and
(1) determining, in response to an input of a pause instruction to temporarily stop a display of the video, a target video frame to be displayed during temporary stop by the pause instruction, and for (2) controlling a compression ratio of the compression processing of the target video frame, so that image quality of the target video frame to be displayed during temporary stop is higher than image quality of the target video frame displayed during non-temporary stop in a case where the pause instruction is not input during the display of the video.

18. The storage medium according to claim 17, wherein the program further comprises controlling a compression ratio processing so that image quality of one or more video frames which are prior to the target video frame in a display order so that image quality of the one or more video frames becomes lower than image quality of the one or more video frames in the case where the pause instruction is not input.

19. The storage medium according to claim 17, wherein the program further comprises controlling a compression ratio of one or more non-reference frames which are not referred to by compression processing on the target video frame so that image quality of the one or more non-reference frames becomes lower than image quality of the one or more non-reference frames in the case where the pause instruction is not input.

20. A storage medium storing a program for causing a computer to operate as an image display apparatus configured to display a video, the program comprising:

inputting a video frame constituting the video;

performing at least one type of video processing among a plurality of types of video processing on the input video frame; and (1) determining, in response to an input of a pause instruction to temporarily stop a display video, a target video frame to be displayed during temporary stop by the pause instruction, and for (2) determining a type of video processing to be performed on the target video frame from among the plurality of types of video processing, so that image quality of the target video frame on which the determined type of video processing is performed and displayed during temporary stop in response to the pause instruction is higher than image quality of the target video frame displayed during non-temporary stop in a case where the pause instruction is not input during the display video.

21. The storage medium according to claim 20, wherein the program further comprises, determining to perform first type video processing on the target video frame to be displayed during the temporary stop and determining to perform second type video processing on a video frame which is input next to the target video frame to be displayed during the temporary stop.

* * * * *